US008625423B2

(12) United States Patent
Yano et al.

(10) Patent No.: US 8,625,423 B2
(45) Date of Patent: *Jan. 7, 2014

(54) DEVICE AND METHOD FOR RELAYING PACKETS

(75) Inventors: Hiroki Yano, Toyota (JP); Kazuo Sugai, Hadano (JP); Shinichi Akahane, Hachioji (JP); Takao Nara, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 266 days.

This patent is subject to a terminal disclaimer.

(21) Appl. No.: 13/169,363

(22) Filed: Jun. 27, 2011

(65) Prior Publication Data

US 2011/0255534 A1 Oct. 20, 2011

Related U.S. Application Data

(63) Continuation of application No. 11/830,903, filed on Jul. 31, 2007, now Pat. No. 7,969,880.

(30) Foreign Application Priority Data

Aug. 11, 2006 (JP) ................................. 2006-219455

(51) Int. Cl.
*G01R 31/08* (2006.01)
*H04L 12/28* (2006.01)

(52) U.S. Cl.
USPC .................................... 370/230.1; 370/395.32

(58) Field of Classification Search
None
See application file for complete search history.

(56) References Cited

U.S. PATENT DOCUMENTS

| 2003/0147385 A1 | 8/2003 | Montalvo et al. |
| 2004/0184453 A1 | 9/2004 | Moriwaki |
| 2005/0047334 A1 | 3/2005 | Paul et al. |
| 2005/0276263 A1* | 12/2005 | Suetsugu et al. ............... 370/389 |
| 2007/0121660 A1* | 5/2007 | Ayrapetian et al. ........... 370/411 |

FOREIGN PATENT DOCUMENTS

| JP | 2005-136589 | 5/2005 |
| JP | 2005-252758 | 9/2005 |
| JP | 2005-318222 | 11/2005 |
| JP | 2006-005437 | 1/2006 |
| WO | WO 2005/015851 | 2/2005 |

OTHER PUBLICATIONS

"Link Aggregation", based on the IEEE 802.3ad.

* cited by examiner

*Primary Examiner* — Eunsook Choi
(74) *Attorney, Agent, or Firm* — Antonelli, Terry, Stout & Kraus, LLP.

(57) ABSTRACT

A system having a plurality of network devices, each including: an interface module including a plurality of physical ports to transmit and receive packets; a computing module configured to execute a computing process with a computational expression using seed information, the seed information including at least one of destination information and source information associated with a received packet; a destination search module configured to, based on the result of the computation, select a physical port for transmission of the received packet from a plurality of candidate ports among the plurality of physical ports; and a modifying module configured to modify the computational expression, wherein the plurality of network devices include preceding-stage and subsequent-stage network devices, the subsequent-stage network device being directly coupled to the preceding-stage network device with physical wiring, and wherein the subsequent-stage and preceding-stage network devices are configured to use different expressions in the computing process.

10 Claims, 16 Drawing Sheets

Fig.3(A)

LINK AGGREGATION TABLE400

| LA NUMBER (TABLE NUMBER) | TOTAL NUMBER OF PHYSICAL PORTS | OUTPUT PORT (SELECTION NUMBER) | | | |
|---|---|---|---|---|---|
| | | #0 | #1 | #2 | ... |
| 0 | 2 | Port#1 | Port#2 | ----- | |
| 1 | ----- | ----- | ----- | ----- | |
| | | ⋮ | | | |

Fig.3(B)

FILTER TABLE410

| VLAN-ID | LINE PORT NUMBER | ADDRESS |
|---|---|---|
| 291 | LA#0 | address1 |
| 291 | Port#3 | address2 |
| ⋮ | ⋮ | ⋮ |

Fig.6(A)

CONTROL INFORMATION 520

| RECEIVING VLAN (500) | INTERNAL PACKET LENGTH (501) | INPUT LINE NUMBER (502) | INPUT L2 HEADER LENGTH (503) |
|---|---|---|---|

Fig.6(B)

HEADER INFORMATION 521

| SOURCE MAC ADDRESS (504) | DESTINATION MAC ADDRESS (505) | SOURCE IP ADDRESS (506) | DESTINATION IP ADDRESS (507) | SOURCE PORT (508) | DESTINATION PORT (509) |
|---|---|---|---|---|---|

L2 HEADER PORTION 522 — SOURCE MAC ADDRESS, DESTINATION MAC ADDRESS
L3 HEADER PORTION 523 — SOURCE IP ADDRESS, DESTINATION IP ADDRESS
L4 HEADER PORTION 524 — SOURCE PORT, DESTINATION PORT $$\text{SELECTION NUMBER (SELECTED PORT)} = \text{QUOTIENT}\left(\frac{\text{HASH VALUE} (0-255) \times \text{TOTAL NUMBER OF PORTS}}{256}\right)$$

WHERE TOTAL NUMBER OF PORTS = 2

Fig.11
COMPARATIVE EXAMPLE
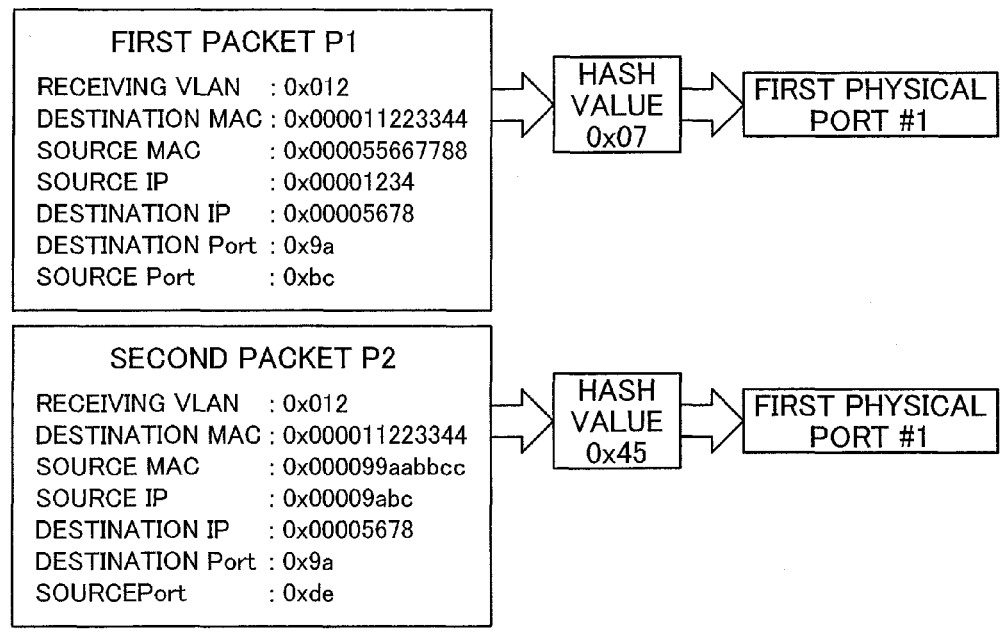
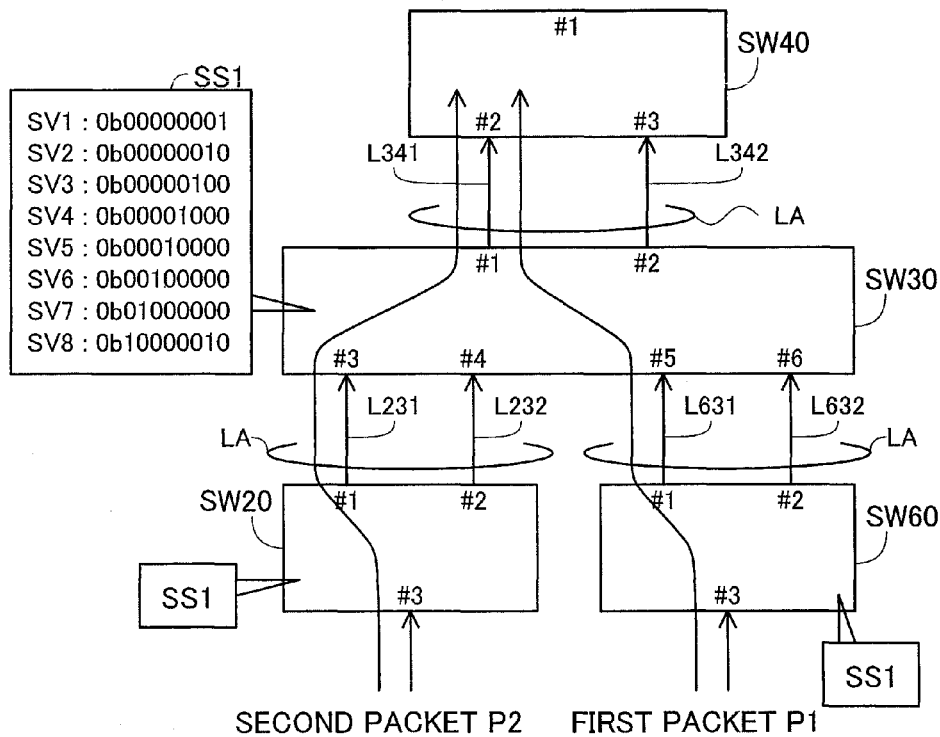

Fig.12
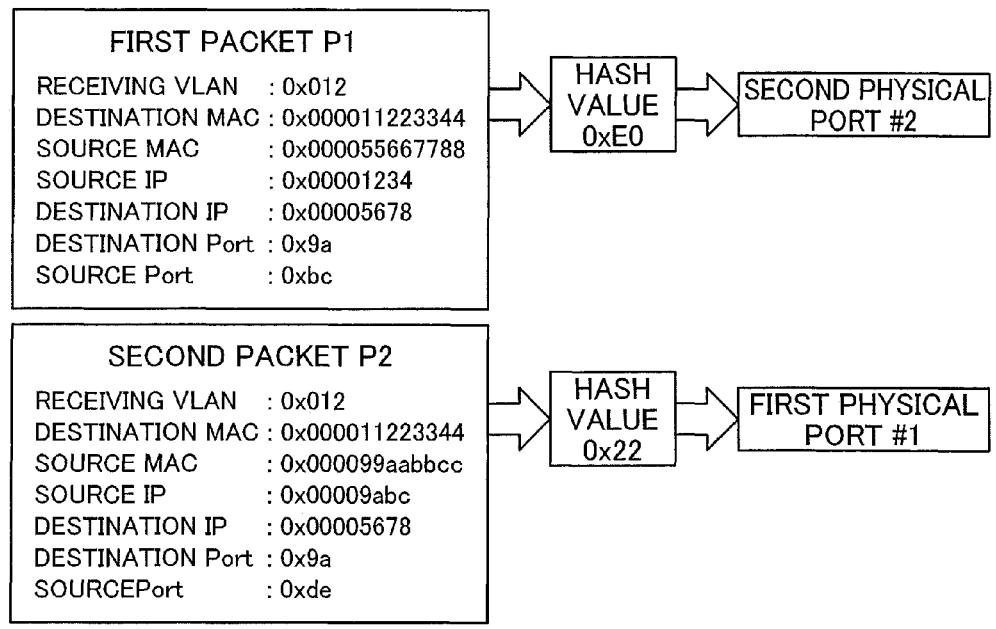
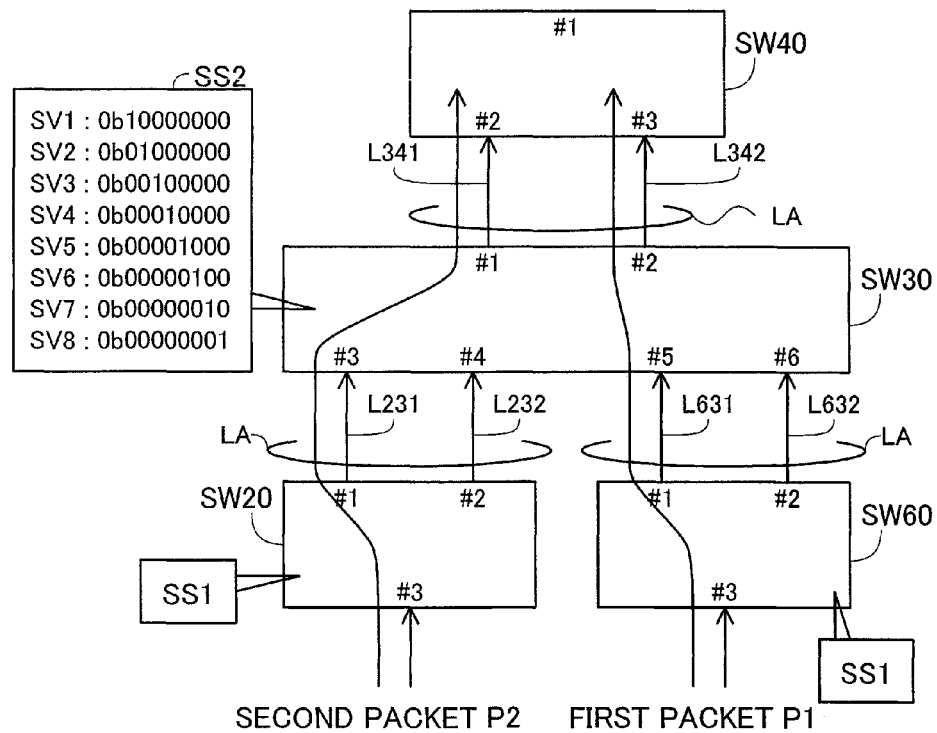

Fig.14(A)

ROUTING TABLE 430

| DESTINATION IP ADDRESS | LOGICAL INTERFACE (VLAN-ID) | NEXT HOP IP ADDRESS | METRIC | |
|---|---|---|---|---|
| IPrange1 | 291 | IPaRT20 | 100 | RE1 |
| IPrange1 | 292 | IPaRT80 | 100 | RE2 |
| IPrange2 | 300 | IPaNHX | 50 | |
| ⋮ | ⋮ | ⋮ | ⋮ | |

Fig.14(B)

ARP TABLE 440

| IP ADDRESS | MAC ADDRESS |
|---|---|
| IPaRT20 | MACaRT20 |
| IPaRT80 | MACaRT80 |
| ⋮ | ⋮ |

Fig.14(C)

FILTER TABLE 410

| VLAN-ID | LINE PORT NUMBER | ADDRESS |
|---|---|---|
| 291 | Port#1 | MACaRT20 |
| 292 | Port#2 | MACaRT80 |
| ⋮ | ⋮ | ⋮ |

EMBODIMENT 3

EMBODIMENT 4

DEVICE AND METHOD FOR RELAYING PACKETS

CROSS-REFERENCE TO RELATED APPLICATIONS

This is a continuation of U.S. application Ser. No. 11/830,903, filed Jul. 31, 2007. This application relates to and claims priority from Japanese Patent Application No. 2006-219455, filed on Aug. 11, 2006. The entirety of the contents and subject matter of all of the above is incorporated herein by reference.

BACKGROUND

1. Technical Field

The present invention relates to a device and a method for relaying packets.

2. Description of the Related Art

Link aggregation based on the IEEE 802.3ad standard is a known redundant configuration for networks. Methods using multiple network relay devices (e.g. switch devices or router devices) to build redundant communication pathways are also known. A method for distributing the communication load, by using a function to convert information (e.g. the header of a frame being transmitted) into an output value, and on the basis of the output value, selecting a transmission cue corresponding to one of several links is also known (see Japanese Patent Published Application No. 2005-252758A). Another related technology is disclosed in Japanese Patent Published Application No. 2006-5437A.

The circumstances under which network systems are utilized vary widely. As a result, in some instances, communication load imbalance will not be alleviated. Particularly in cases where network relay devices are directly connected, communication load imbalance in front end relay devices and communication load imbalance in back end relay devices may cumulatively result in appreciable communication load imbalance.

SUMMARY

An object of the invention is to provide a technology capable of alleviating communication load imbalance.

In a first aspect of the invention, there is provided a network relay device for relaying packets. The network relay device includes an interface module, a computing module, a destination search module, and a modifying module. The interface module includes a plurality of physical ports for connection to lines, and configured to transmit and receive packets through the lines. The computing module is configured to execute a computing process with a computational expression using seed information including at least one of destination information and source information associated with a received packet. The destination search module is configured to, based on the result of the computation, select a physical port for transmission of the received packet from a plurality of candidate ports among the plurality of physical ports. Each of the plurality of candidate ports is able to access a destination identified by the destination information. The modifying module is configured to modify the computational expression.

According to this network relay device, it is possible to alleviate communication load imbalance, because the trend of bias in physical port selection can be altered by modifying the computational expression.

In a second aspect of the invention, there is provided a network relay device for relaying packets. The network relay device includes an interface module, a computing module, a destination search module, and a modifying module. The interface module includes a plurality of physical ports for connection to lines, and configured to transmit and receive packets through the lines. The computing module is configured to execute a computing process with a computational expression using seed information including at least one of destination information and source information associated with a received packet. The destination search module is configured to, based on the result of the computation, select a port group for transmission of the received packet from among a plurality of port groups including a mutually different candidate port. Each port group includes one or more physical ports including a candidate port being able to access a destination identified by the destination information. The modifying module is configured to modify the computational expression.

According to this network relay device, the trend of bias in port group selection can be altered by modifying the computational expression. Accordingly, communication load imbalance can be alleviated as a result.

Preferred Features

In the network relay device of the first aspect, it is preferable that the destination search module has a link aggregation function that aggregates a plurality of physical ports as a single virtual port, and the plurality of candidate ports are included in a single virtual port constructed by the link aggregation function.

With this arrangement, communication load imbalance in multiple physical ports included in a single virtual port can be suppressed.

In the network relay device of the first aspect, it is preferable that the destination search module establishes an order of precedence in the selection of the physical port respectively for the plurality of physical ports, and the order of precedence is respectively the same for the plurality of candidate ports.

With this arrangement, communication load imbalance in multiple physical ports having the same order of precedence can be suppressed.

In the network relay device of the second aspect, it is preferable that the port group forms a virtual LAN architecture that divides a network including the plurality of physical ports into virtual partial networks.

With this arrangement, the trend of bias in selection of virtual LAN for packet transmission can be altered by modifying the computational expression. Accordingly, communication load imbalance can be alleviated as a result.

In the network relay device of the first and the second aspects, it is preferable that the computational expression is a hash function.

With this arrangement, bias of physical port selection towards a specific physical port can be suppressed.

In the network relay device of the first and the second aspects, it is preferable that the modifying module modifies the computational expression based on an instruction by a user.

With this arrangement, it is possible for user intent to be reflected in the communication load distribution.

In the network relay device of the first and the second aspects, it is preferable that the modifying module identifies a computational expression used by another network relay device connected to the network relay device through communication with the another network relay device, and automatically changes the computational expression used in the computing process, into a computational expression different from the identified computational expression.

With this arrangement, it is possible for the trend of communication load imbalance in this network relay device to differ from the trend of communication load imbalance in another network relay device. As a result, it is possible to avoid a situation where communication load imbalance in this network relay device and communication load imbalance in the other network relay device cumulatively result in appreciable communication load imbalance.

The present invention may be reduced to practice in various other ways, for example, a network relay method and device; a computer program for realizing the functions of such a method or device; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A)-3(B) illustrate a link aggregation table 400 and a filter table 410;

FIGS. 6(A)-6(B) show control information 520 and header information 521;

FIG. 11 is an illustration depicting a comparative example of packet relay in a network system 900;

FIG. 12 is an illustration depicting an embodiment of packet relay in the network system 900;

FIGS. 14(A)-14(C) illustrate an exemplary routing table, ARP table, and filter table;

DESCRIPTION OF THE PREFERRED EMBODIMENT

The embodiments of the present invention will be described herein in the order indicated below.
A. Embodiment 1:
B. Embodiment 2:
C. Embodiment 3:
D. Embodiment 4:
E: Variants:

A. Embodiment 1

Figure 1:
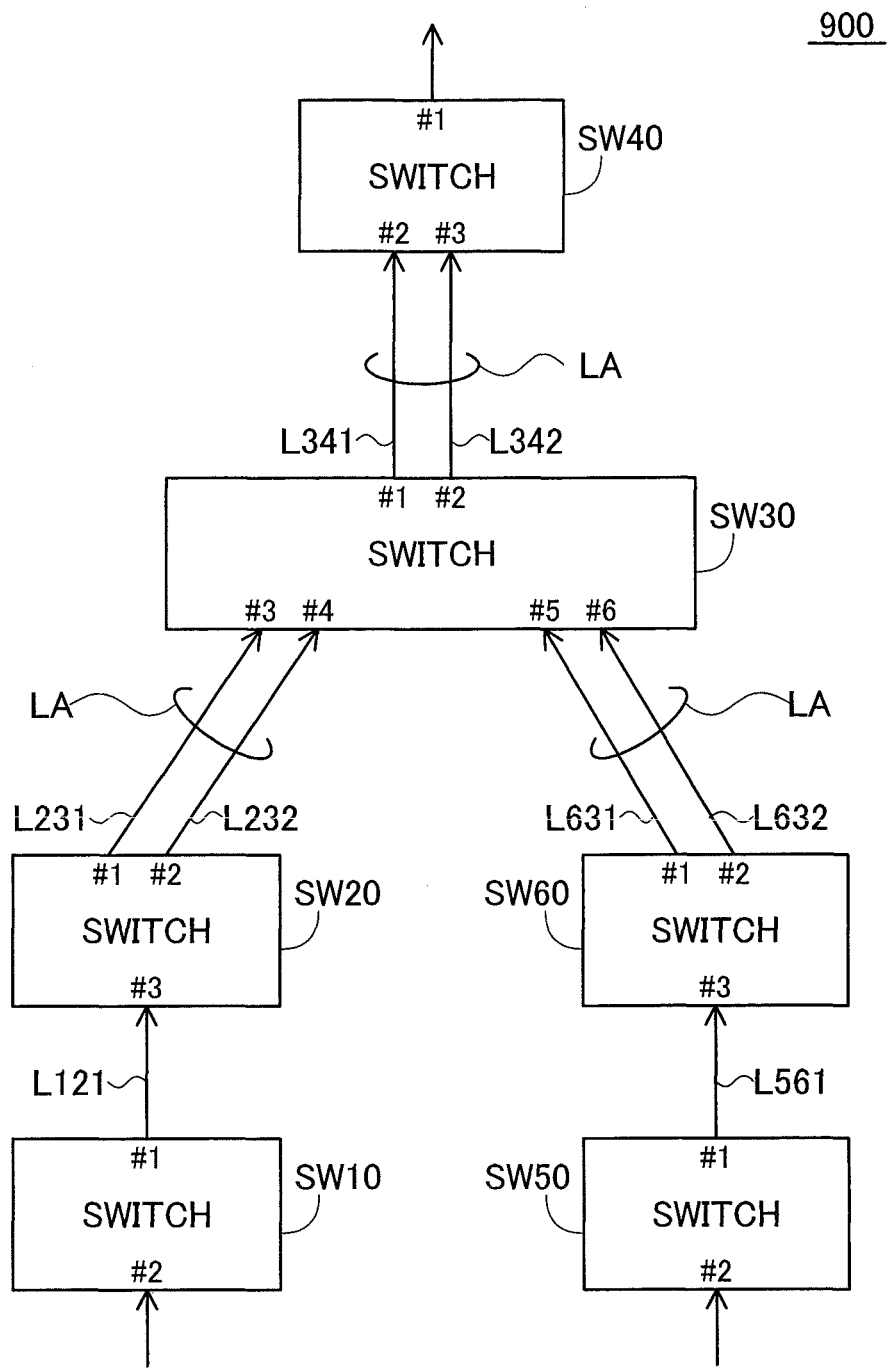
FIG. 1 is an illustration of a network system employing switch devices in an embodiment of the present invention.

FIG. 1 is an illustration of a network system employing switch devices in an embodiment of the present invention. This network system 900 has six switch devices SW10 to SW60. In Embodiment 1, these switch devices SW10 to SW60 all function as "Layer 2 switches."

Three of the switch devices SW20, SW40, and SW60 are connected to the third switch device SW30. The third switch device SW30 is respectively connected by two lines with the switch devices SW20, SW40, and SW60. The first switch device SW10 and the second switch device SW20 are connected by a single line L121; and the fifth switch device SW50 and the sixth switch device SW60 are connected by a single line L561.

The switch devices SW10 to SW60 have physical ports for the purpose of connecting to the lines. In FIG. 1, physical port numbers identifying the physical ports are denoted by a combination of the symbol "#" with a number. For example, the line L121 connecting the first switch device SW10 with the second switch device SW20 connects the first physical port (#1) of the first switch device SW10 with the third physical port (#3) of the second switch device SW20.

The second switch device SW20 and the third switch device Sw30 are connected by two lines L231, L232. By the link aggregation function, these two lines L231, L232 are utilized as a single virtual line. The link aggregation function is a function whereby several physical ports are aggregated as utilized as a single virtual port (also termed a "logical port"). This link aggregation function is used for the purpose of achieving wider bandwidth and of ensuring redundancy. In the example of FIG. 1, the two physical ports #1, #2 of the second switch device SW20 are utilized as a single logical port by the link aggregation function. The two physical ports #3, #4 of the third switch device SW30 to which these ports #1, #2 are connected are also utilized as a single logical port by the link aggregation function.

Similarly, the two lines L631, L632 connecting the third switch device SW30 and the sixth switch device SW60 are utilized as a single virtual line by the link aggregation function. The two lines L341, L342 connecting the third switch device SW30 and the fourth switch device SW40 are utilized as a single virtual line by the link aggregation function.

Hereinafter, logical ports set up by the link aggregation function, and physical ports not included in any logical ports (herein also termed "independent physical ports") will be referred to respectively as "line ports." That is, in the switch devices SW, the line port is utilized as a port for connection of single independent line (including single virtual line).

Figure 2:
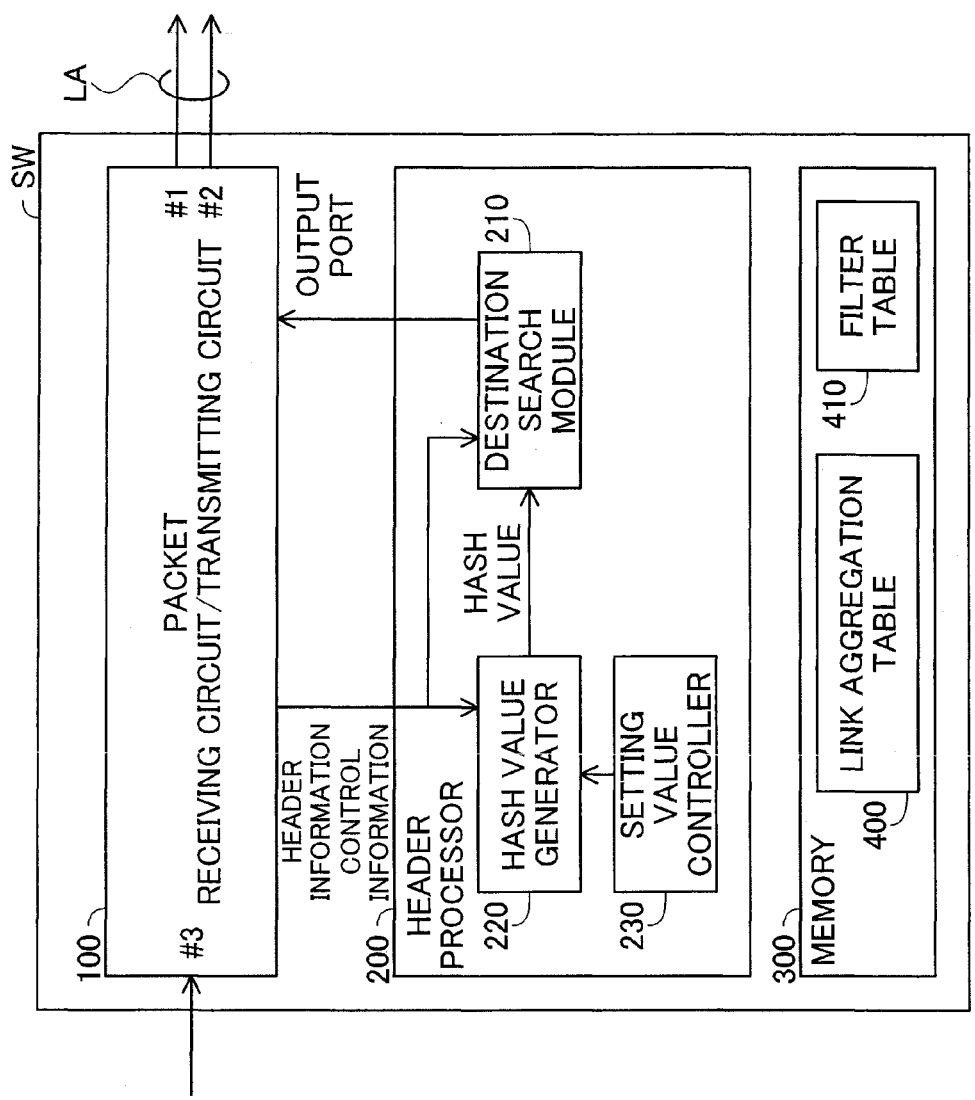
FIG. 2 is an illustration depicting the configuration of a switch device SW.

FIG. 2 is an illustration depicting the configuration of a switch device SW. In Embodiment 1, the same switch devices SW are used as the switch devices SW10 to SW60 (FIG. 1). This switch device SW has a packet receiving circuit/transmitting circuit 100 (hereinafter termed "interface circuit 100"), a header processor 200, and a memory 300. These constituent elements 100, 200, 300 are interconnected by a bus (not shown).

The interface circuit 100 is an electronic circuit for receiving and transmitting packets, and has several physical ports for connection to the lines. In the example of FIG. 2, three physical ports #1 to #3 are shown. The two ports #1 and #2 are utilized as a single logical port, by the link aggregation function.

The header processor 200 executes a process for determining which physical port should transmit received packets (hereinafter termed the "output physical port"). This process will be termed "destination search process". The header processor 200 is an ASIC (Application Specific Integrated Circuit) designed to achieve various functions, discussed later. The header processor 200 has a destination search module 210, a hash value generator 220, and a setting value controller 230.

The memory 300 stores various data for use in the destination search process. In the example of FIG. 2, a link aggregation table 400 and a filter table 410 are stored in the memory 300. FIG. 3(A) is an illustration of an example of the link aggregation table 400. The link aggregation table 400 is a table that defines logical ports. The link aggregation table 400 specifies associations between a link aggregation number unique to a logical port (also termed an "LA number" or "table number"), the total number of physical ports included in the logical port, and the physical ports included in the logical port. In the example of FIG. 3(A), the entirety of two physical ports, namely a first physical port #1 and a second physical port #2, are utilized as a single virtual port (logical port). The logical port is assigned an LA number of "0."

Each of the several physical ports included in a single logical port is assigned a selection number identifying the physical port. The selection number is an integer starting from 0. In the example of FIG. 3(A), the first physical port #1 is assigned a selection number of "0" and the second physical port #2 is assigned a selection number of "1." This selection number will be utilized in the destination search process, to be discussed later.

The destination search module 210 establishes values for each entry of the link aggregation table 400 according to instructions by the user. User instructions may be input, for example, via a control panel (not shown) provided to the switch device SW, or an administration terminal (not shown) connected to the switch device SW.

The total number of physical ports included in a single logical port is not limited to "2," any number could be employed. Likewise, the total number of logical ports utilized by a single switch device SW is not limited to "1"; any number could be employed.

FIG. 3(B) is an illustration of an example of the filter table 410. The filter table 410 stores associations among a VLAN-ID, a line port, and the Layer 2 address (MAC address) of a network device connected to the line port.

The VLAN-ID is an identifying number of a VLAN (Virtual Local Area Network). A VLAN represents a group including one or more line ports capable of communication with one another at the Layer 2 level. Specifically, in Embodiment 1, the destination search module 210 relays packets exclusively between line ports belonging to the same VLAN, and will not relay packets to different VLANs. By dividing multiple line ports into multiple VLANs in this way, it is possible to prevent the communication load from extending to unintended line ports (other VLANs). Specifically, a network including a multiplicity of physical ports can be divided in to virtual partial networks (also called "network segments").

In the example of FIG. 3(B), the VLAN-IDs of the 0th logical port (LA#0) and the third physical port (Port #3) are each set to "291". In the same way as with the link aggregation table 400, the destination search module 210 establishes associations between the line ports and the VLAN-IDs in accordance with user instructions. The total number of VLANs utilized by a single switch device SW is not limited to "1""; any number could be employed. Likewise, the VLAN-ID is not limited to the number "291," and could be any other number instead.

The associations between line ports and MAC addresses in the filter table 410 are established automatically by the destination search module 210. Specifically, the destination search module 210 acquires the source MAC address by looking up the header information of a packet received by the switch device SW. The destination search module 210 then registers in the filter table 410 an association of the source MAC address with the line port that received the packet. In the event that the physical port which received the packet is an independent physical port, the physical port number will be registered. Where the physical port which received the packet is included in a logical port, the LA number of the logical port will be registered. In the example of FIG. 3(B), an association between the 0th logical port (LA#0) and a first address (address 1), and an association between the third physical port #3 and a second address (address 2), are registered.

Multiple network devices may be connected to a single line port. In this case, multiple addresses will be registered in relation to the single line port. Expiration information specifying an expiry date for registered data could be registered in the filter table 410 as well. Where data whose expiry date has passed is deleted from the filter table 410, it becomes a simple matter to update the filter table 410 according to changes in network configuration. The efficiency of utilization of the memory 300 may be improved as well. As the expiry date it would be possible to employ a prescribed period of time elapsed since registration. With regard to physical ports included in a logical port as well, the physical port numbers could be registered in place of the LA number.

Figure 4:
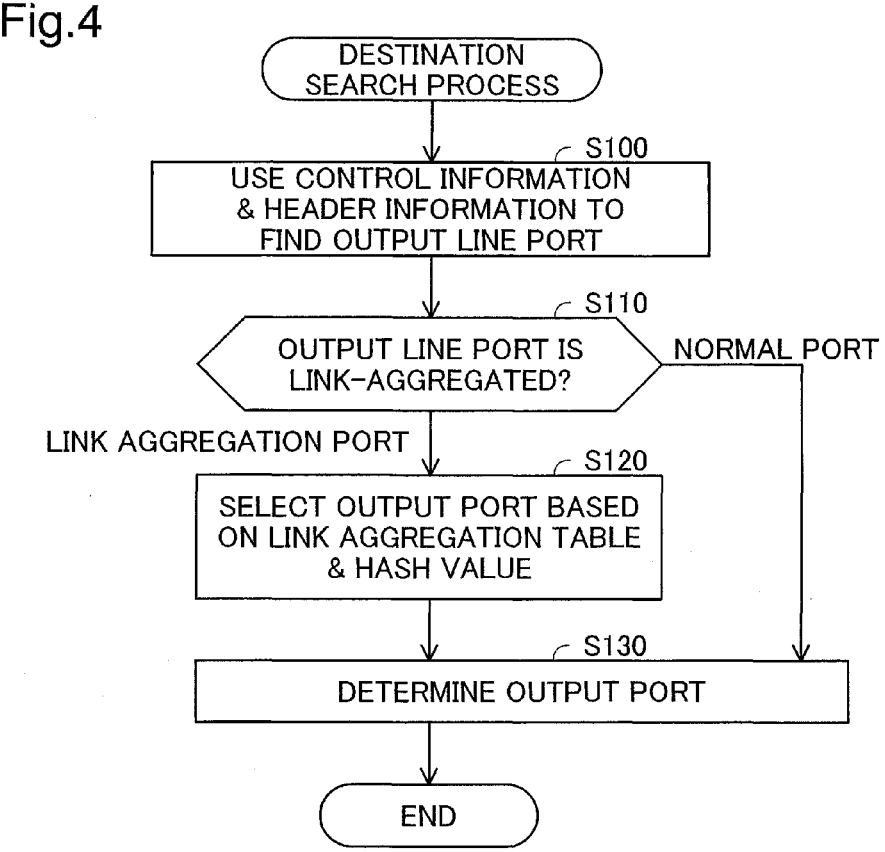
FIG. 4 is a flowchart depicting the procedure of a destination search process.

FIG. 4 is a flowchart depicting the procedure of the destination search process. In the initial Step S100, the destination search module 210 (FIG. 2) refers to the header information of the packet and to the filter table 410 (FIG. 2, FIG. 3(B)) in order to search for the line port that is to transmit the received packet. Specifically, the destination search module 210 acquires the destination MAC address from the header information and searches the filter table 410 for the line port to which the destination MAC address belongs. In this process, line ports included in the same VLAN as the line port which received the packet are searched for the line port. That is, other VLANs are not searched for the line port.

In the next Step S110, the destination search module 210 decides whether the searched line port is a logical port (link aggregation port) or a normal port (independent physical port). In the event that the searched line port is a normal port (independent physical port), the destination search module 210 will employ that physical port as the output physical port (Step S130).

In the event that the searched line port is a logical port, in the next Step S120, the destination search module 210 selects one physical port from among the multiple physical ports included in the logical port. The selected physical port is then designated as the output physical port (S130). A hash value generated by the hash value generator 220 (FIG. 2) is used for selecting the physical port. The hash value generator 220 computes the hash value on the basis of the header information from the received packet, and control information provided by the interface circuit 100. The specifics of physical port selection using hash values will be discussed later.

Once the output physical port has been determined, the destination search module 210 (FIG. 2) notifies the interface circuit 100 about the output physical port. The interface circuit 100 then transmits the packet from the notified output physical port.

In the event that the searched line port and the line port that received the packet are the same, it will not be necessary to relay the packet, so the destination search module 210 will suspend packet transfer. In the event that the line port cannot be found in the filter table 410, the destination search module 210 will select all of the line ports, except for the line port that received the packet, as the line ports for transmitting the packet (this is also termed "flooding"). However, in this case, only line ports included in the same VLAN as the line port that received the packet will be selected.

Figure 5:
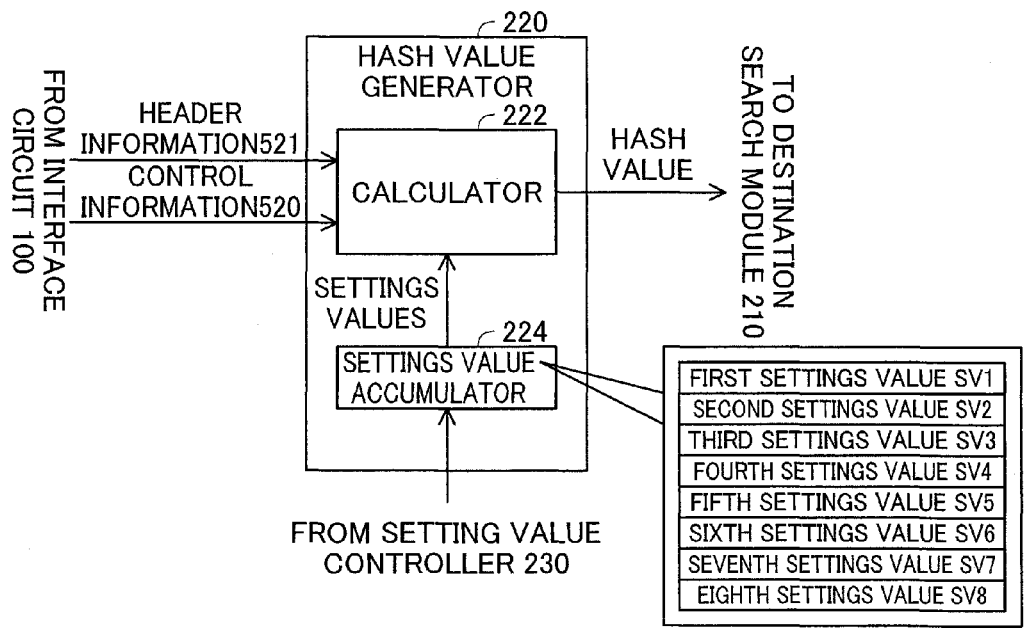
FIG. 5 is an illustration depicting the internal configuration of a hash value generator 220 (FIG. 2)

FIG. 5 is an illustration depicting the internal configuration of the hash value generator 220 (FIG. 2). The hash value generator 220 has a calculator 222 and a settings value accumulator (memory) 224.

The settings value accumulator 224 stores eight settings values SV1 to SV8 established by the setting value controller 230 (FIG. 2). Each of the eight setting values SV1 to SV8 is composed of 8-bit data, and is used in the computation of hash values. These setting values will be referred to hereinbelow as "hash setting values." The setting value controller 230 sets each of the setting values SV1 to SV8 in accordance with user instructions. User instructions may be input, for example, via a control panel (not shown) of the switch device SW, or an administration terminal (not shown) connected to the switch device SW. Also, it would be acceptable to instead have the setting value controller 230 set the setting values SV1 to SV8 automatically. For example, the setting value controller 230 could generate data randomly, and use the data obtained thereby as the setting values SV1 to SV8.

The calculator 222 is provided with the control information 520 and the header information 521 by the interface circuit 100. The calculator 222 is also provided with the eight setting values SV1 to SV8 by the settings value accumulator 224. Using the data provided to it, the calculator 222 computes a hash value, and provides the computed hash value to the destination search module 210.

FIG. 6(A) is an illustration showing the control information 520. The control information 520 is provided for each packet received by the interface circuit 100. That is, the control information 520 is information associated with packet. The control information 520 includes the receiving VLAN 500, internal packet length 501, input line number 502, and input L2 header length 503. The receiving VLAN 500 indicates the number (FIG. 3B: VLAN-ID) of the VLAN (virtual LAN) to which the line port which received the packet belongs. The internal packet length 501 indicates the size of the packet. The input line number 502 indicates the number of the physical port that received the packet. The input L2 header length 503 indicates the size of the L2 header portion 522, to be discussed later. This data is appropriately used for checking packet integrity and so on (not discussed in detail herein).

FIG. 6(B) is an illustration showing header information 521. The header information 521 is the header of a packet acquired by the interface circuit 100. The header information 521 includes an L2 (Layer 2) header portion 522, an L3 (Layer 3) header portion 523, and an L4 (Layer 4) header portion 524. The L2 header portion 522 includes a source MAC address 504 and a destination MAC address 505. The L3 header portion 523 includes a source IP address 506 and a destination IP address 507. The L4 header portion 524 includes a source port 508 and a destination port 509. The ports 508, 509 are data indicating so-called Layer 4 ports (also referred to herein as "L4 ports") and are unrelated to the line ports of the switch devices SW.

Figure 7:
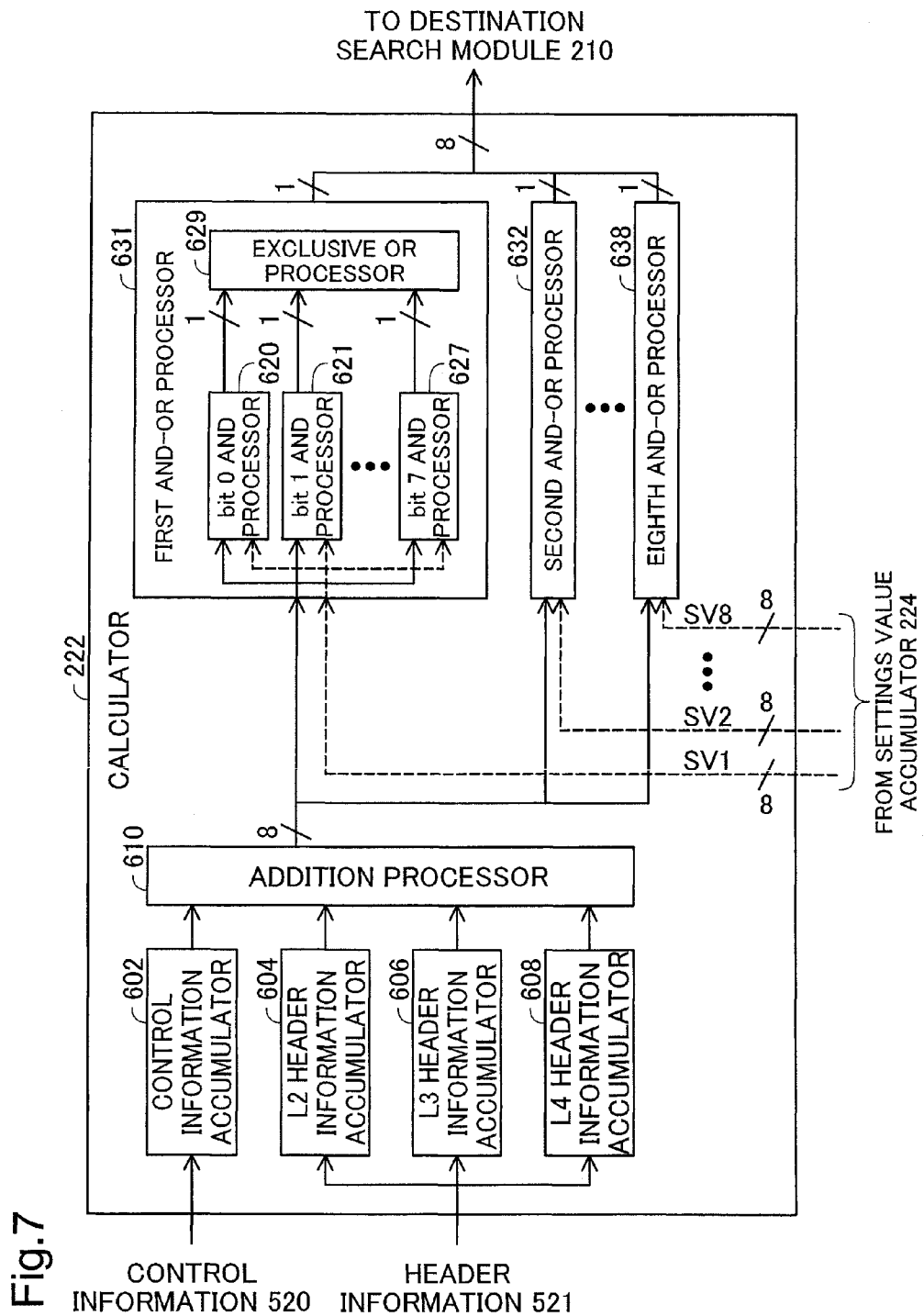
FIG. 7 is an illustration depicting the internal configuration of a calculator 222.

FIG. 7 is an illustration depicting the internal configuration of the calculator 222. The calculator 222 has four accumulators (buffer memories) 602 to 608, an addition processor 610, and eight AND-OR processors 631 to 638.

Figure 8:
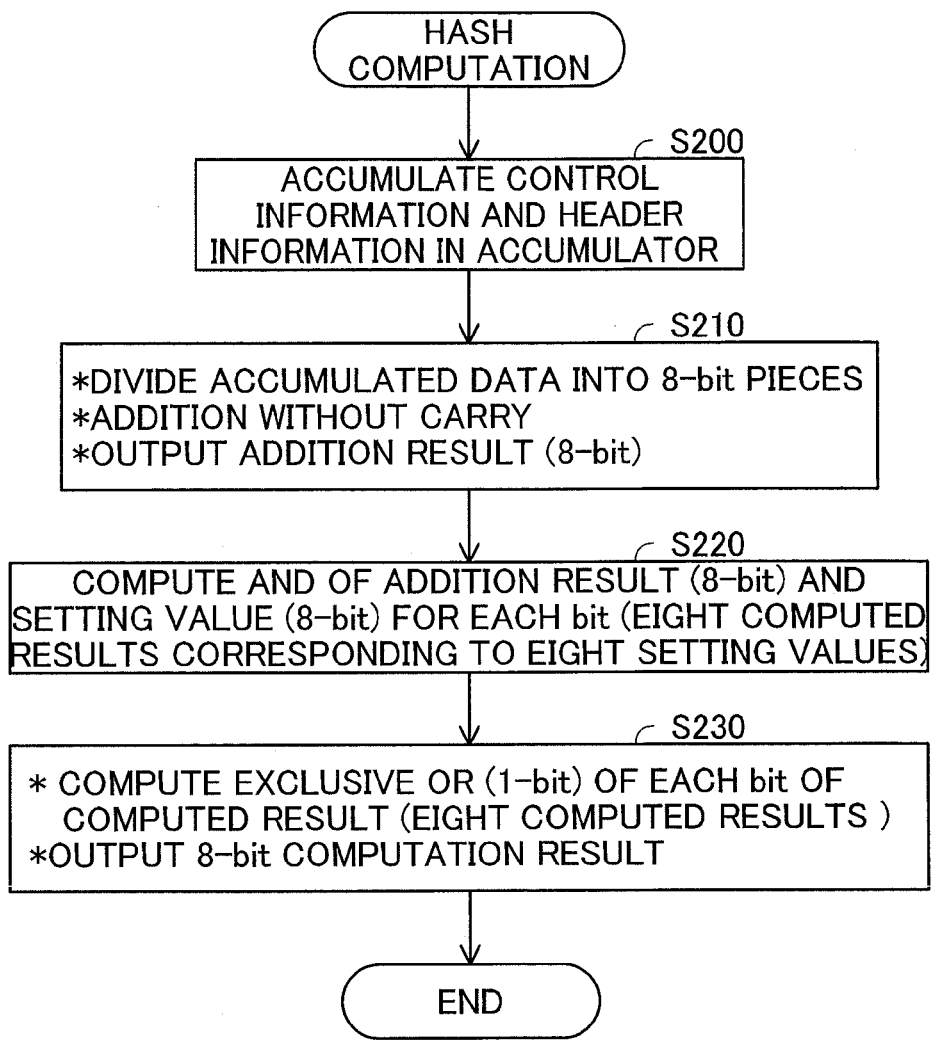
FIG. 8 is a flowchart depicting the procedure of computation of hash values by the calculator 222.
Figure 9:
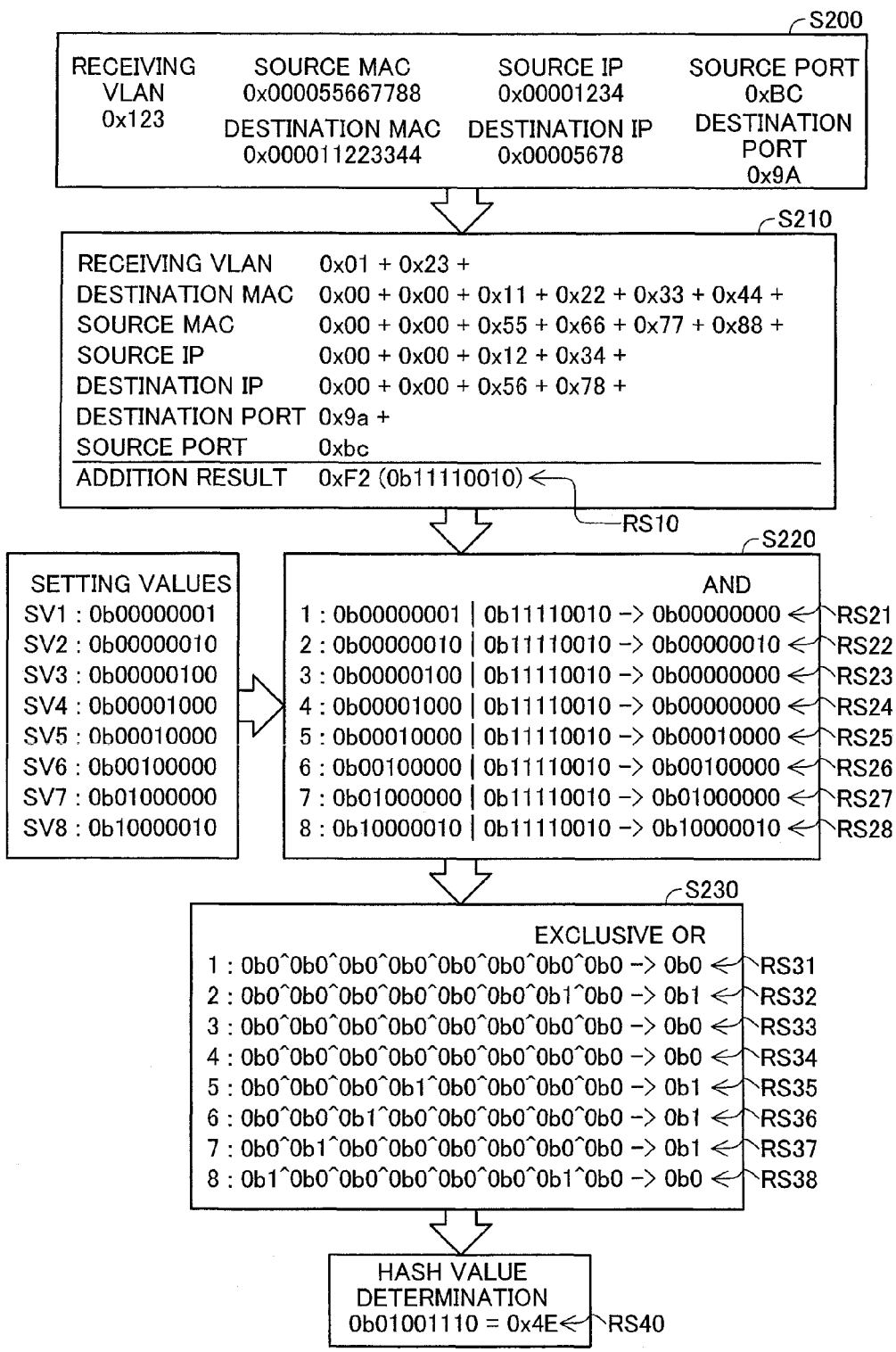
FIG. 9 is an illustration depicting a specific example of hash value computation.

FIG. 8 is a flowchart depicting the procedure of computation of hash values by the calculator 222. FIG. 9 is an illustration depicting a specific example of hash value computation. In the initial Step S200, the four accumulators 602 to 608 (FIG. 7) have respectively stored therein, on a temporary basis, the control information 520, the L2 header portion 522, the L3 header portion 523, and the L4 header portion 524. The field of Step S200 in FIG. 9 shows specific values of target data used in the computation, selected from the stored data. In Embodiment 1, the receiving VLAN, the source and destination MAC addresses, the source and destination IP addresses, and the source and destination L4 ports are utilized in the computation.

In FIG. 9, the symbol "0x" appended to the front of values indicates that that value is represented in hexadecimal form. Similarly, the symbol "0b" appended to the front of values indicates that that value is represented in binary form. These symbols "0x" and "0b" have the same meaning in the following description and other drawings as well.

In the next Step S210, the addition processor 610 (FIG. 7) performs addition of the target data stored in the accumulators 602 to 608, in order to output an 8-bit addition result. In this process, the addition processor 610 first divides all of the target data into 8-bit pieces. The addition processor 610 then adds up all of the pieces of 8-bit data. This addition is performed without carry. An 8-bit addition result is obtained thereby. For example, in the example of FIG. 9, the receiving VLAN (0x123) is divided into two pieces of 8-bit data "0x01" and "0x23." The other data is similarly divided into two pieces of 8-bit data. All of the pieces of 8-bit data obtained in this way are then added. As a result, an 8-bit addition result RS10 is output.

In the next Step S220, the eight AND-OR processors 631 to 638 (FIG. 7) respectively execute an AND operation using the 8-bit addition result and 8-bit setting values supplied by the settings value accumulator 224. Then, in the next Step S230, the eight AND-OR processors 631 to 638 respectively perform an exclusive OR operation on each bit of the AND operation result. In this process, the eight setting values SV1 to SV8 are utilized respectively by the eight AND-OR processors 631 to 638. For example, the first setting value SV1 is utilized by the first AND-OR processor 631, and the second setting value SV2 is utilized by the second AND-OR processor 632.

The first AND-OR processor 631 first computes the AND operation result RS21 from the first setting value SV1 and the addition result RS10 (FIG. 9). In this process, the logical product (AND operation) is computed for each individual bit. As shown in FIG. 7, the first AND-OR processor 631 has seven AND processors 620 to 627. Each of the AND processors 620 to 627 executes a 1-bit AND operation at a different bit location. The first AND operation result RS21 (8-bit) is the combination of the operation results (1-bit) of the AND processors 620 to 627. The operator "|" in the field of Step S220 in FIG. 9 denotes logical product.

In the next Step S230, the first AND-OR processor 631 computes exclusive OR for each bit of the first AND operation result RS21. As shown in FIG. 7, the first AND-OR processor 631 has an exclusive OR processor 629. The exclusive OR processor 629 executes the exclusive OR operation using the eight operation results (1-bit) provided by the AND processors 620 to 627. As a result, a 1-bit first exclusive OR operation result RS31 (FIG. 9: S230) is computed. The operator "^" in the field of Step S230 in FIG. 9 denotes exclusive OR.

The internal configuration and operation of the other AND-OR processors 632 to 638 (FIG. 7) are the same as those of the first AND-OR processor 631. Specifically, in Step S220, AND operation results RS21 to RS28 are calculated respectively by the AND-OR processors 631 to 638. In Step S230, exclusive OR operation results RS31 to RS38 are calculated respectively by the AND-OR processors 631 to 638.

The calculator 222 puts together the eight exclusive OR operation results RS31 to RS38 (1-bit), treating them as a single operation result RS40 (8-bit). The calculator 222 then outputs the operation result RS40 as a hash value, to the destination search module 210.

Figures 10A, 10B:
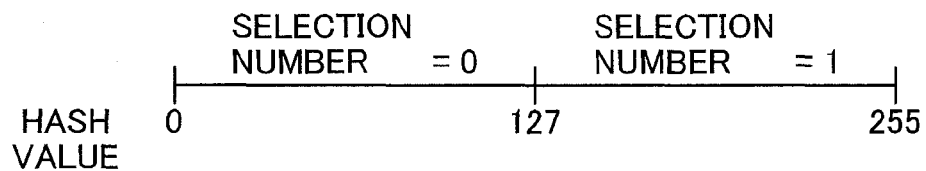
FIGS. 10(A)-10(B) illustrate the relationship between output physical ports and hash values.

FIG. 10(A) gives a relational expression that defines the association between output physical ports and hash values. The destination search module 210 selects the output physical port (FIG. 4: Step S120) in accordance with this relational expression. Specifically, in accordance with this relational expression, the destination search module 210 first divides the "hash value*total number of physical ports" by 256. "256" is the size of value range of hash values. The quotient corresponds to the selection number in the link aggregation table 400 (FIG. 3 (A)). In the event that the quotient is "0," the physical port whose selection number is "0" will be selected. In the event that the quotient is "1," the physical port whose selection number is "1" will be selected. The process is analogous for quotients of "2" and above.

FIG. 10(B) illustrates the relationship between hash values and selection numbers. FIG. 10(B) shows an example in which the total number of physical ports included in the logical port is 2. In this case, "hash value*total number of physical ports" will assume a value in a range between 0 and 510. Accordingly, the quotient will be either 0 or 1. Specifically, where the hash value lies in a range between 0 and 127, the selection number will be 0. Where the hash value lies in a range between 128 and 255, the selection number will be 1.

In this way, with reference to the hash value, one output physical port is selected from among multiple physical ports included in a logical port. The hash value can assume various values depending on the data (seed information) used to compute the hash value. In Embodiment 1, the hash value is computed on the basis of data representing the source (MAC address, IP address, L4 port) and data representing the destination (MAC address, IP address, L4 port). Accordingly, the communication load (output physical port) can be distributed according to the combination of source and destination. This also applies to cases where the total number of physical ports included in the logical port is 3 and above.

FIG. 11 is an illustration depicting a comparative example of packet relay in a network system 900. Depending on the conditions of utilization of the network system 900, output physical port selection may be biased towards certain physical ports. This comparative example illustrates such a case.

FIG. 11 depicts relay of a first packet P1 from the sixth switch device SW60 to the fourth switch device SW40 via the third switch device SW30. FIG. 11 also depicts relay of a second packet P2 from the second switch device SW20 to the fourth switch device SW40 via the third switch device SW30. In this way, the network configuration is a multi-stage configuration in which the second switch device SW20 and the sixth switch device SW60 are connected the front end of the third switch device SW30.

FIG. 11 shows the eight setting values SV1 to SV8 that have been set in the third switch device SW30 (hereinafter the set of these setting values will be termed the "first setting value set SS1"). FIG. 11 also shows target data relating to the first packet P1 (control information and header information). The third switch device SW30 computes a hash value on the basis of this data. Then, on the basis of the computed hash value, the third switch device SW30 selects a physical port for transmitting the first packet P1, from among the first physical port #1 and the second physical port #2. In the example of FIG. 11, the hash value relating to the first packet P1 is "0x07," and the first physical port #1 is selected.

An output physical port for the second packet P2 is selected in the same manner FIG. 11 also shows target data relating to the second packet P2 (control information and header information). In the example of FIG. 11, the hash value relating to the second packet P2 is "0x45," and the first physical port #1 is selected.

In this comparative example, the hash setting values set for the sixth switch device SW60 are the same as those of the first setting value set SS1. Accordingly, the sixth switch device SW60, like the third switch device SW30, will select the first physical port #1 as the output physical port for the first packet P1. Furthermore, the hash setting values set for the second switch device SW20 are the same as those of the first setting value set SS1. Accordingly, the second switch device SW20, like the third switch device SW30, will select the first physical port #1 as the output physical port for the second packet P2.

Here, a case where the various packets are relayed from the sixth switch device SW60 to the fourth switch device SW40 via the third switch device SW30 will be considered. Let it be assumed that, when a packet is transmitted from the sixth switch device SW60, the first physical port #1 is selected proportionally more frequently than the second physical port #2. Such bias in output physical port (traffic) can occur for a number of reasons, such as due to address settings of network devices. Thus, when these packets are transmitted from the third switch device SW30 as well, the first physical port #1 will be selected proportionally more frequently than the second physical port #2. This is because the sixth switch device SW60 and the third switch device SW30 utilize the same first setting value set SS1.

Similarly, a case where the various packets are relayed from the second switch device SW20 to the fourth switch device SW40 via the third switch device SW30 will be considered. Let it be assumed that, when a packet is transmitted from the second switch device SW20, the first physical port #1 is selected proportionally more frequently than the second physical port #2. Thus, when these packets are transmitted from the third switch device SW30 as well, the first physical port #1 will be selected proportionally more frequently than the second physical port #2. This is because the second switch device SW20 and the third switch device SW30 utilize the same first setting value set SS1.

In this way, in the network system 900, the three switch devices SW20, SW30, SW60 are connected in a tree configuration. As a result, output physical port bias in the third switch device SW30 situated in a subsequent stage represents a combination of physical port bias produced in the two switch devices SW20, SW60 situated in a preceding stage. In the comparison example here, the three switch devices SW20, SW30, SW60 utilize the same hash setting values (i.e. the same computational expression). As a result, the trend of bias in output physical port selection will be the same in all three switch devices SW20, SW30, SW60. Accordingly, bias in output physical port selection (traffic bias) in the third switch device SW30 situated in a subsequent stage will be considerable as a result of compounding of bias having the same trend. Such bias will increase with a greater number of switch device SW stages.

FIG. 12 is an illustration depicting an embodiment of packet relay in the network system 900. The only difference from the comparative example illustrated in FIG. 11 is that the second setting value set SS2 used by the third switch device SW30 differs from the first setting value set SS1. Other arrangements are the same as in the comparative example. The second switch device SW20 and the sixth switch device SW60 utilize the first setting value set SS1 discussed above.

A specific example of the second setting value set SS2 is shown in FIG. 12. The second setting value set SS2 differs from the first setting value set SS1 shown in FIG. 11. More accurately, the second setting value set SS2 differs at least in part from the first setting value set SS1. Whereas the first setting value set SS1 includes an eighth setting value SV8 in which two of the bits are set to 1, the second setting value set SS2 includes no such setting value.

Hash values and output physical ports relating to two packets P1, P2 are shown in FIG. 12. These hash values and output physical ports are determined by the third switch device SW30. The two packets P1, P2 are respectively identical to the two packets P1, P2 shown in FIG. 11. However, due to the use of a different computational expression (the second setting value set SS2) than that in the comparative example, the computed hash values differ from those of the comparative example. In the example of FIG. 12, the hash value relating to the first packet P1 is "0xE0," and the hash value relating to the second packet P2 is "0x22." As a result, the second physical port #2 will be selected in relation to the first packet P1, while the first physical port #1 will be selected in relation to the second packet P2.

Where at least some of the hash setting values differ in the manner described above, that is, where the computational expression is different, different hash values will be computed for the same packets. As a result, it is possible to alter the trend of bias in output physical port selection. For example, whereas in the comparative example of FIG. 11, the same first physical port was selected for each of the two packets P1, P2 by the third switch device SW30, in the embodiment of FIG. 12, different physical ports are selected respectively for the two packets P1, P2. In this way, even in instances where bias in output physical port selection can occur, bias in output physical port selection can be alleviated easily simply by changing the computational expression (hash setting value set). In the event of considerable bias in output physical port selection, it will suffice for the user to input an instruction to change the hash setting values, to the setting value controller 230 (FIG. 2).

The condition of utilization of a network system frequently vary. For example, there are instances in which a new network device (such as a client device or server device) is connected to the network. There are also instances in which a previously used network device is removed from the network. In Embodiment 1, the computational expression is modified for the purpose of alleviating bias in output physical port selection. Consequently, bias increasing in output physical port selection in the event of a change in conditions of utilization of a network system subsequent to modification of the computational expression is suppressed.

This can be explained as follows. Assume for example that associations between computation results and output physical ports are changed, with no modification of the computational expression, in such a way as to minimize bias in output physical port selection. In this case, the magnitude of the ranges of computation results associated with physical ports will become unequal. Specifically, for physical ports having small communication load, a wider range of computation results will be associated with the port in order to increase the communication load. Conversely, for physical ports having high communication load, a narrow range of computation results will be associated with the port in order to decrease the communication load. Now assume that condition of utilization of a network system changes. Notwithstanding the fact that the condition of utilization of a network system has changed, output physical port selection will continue to be executed on the basis of the unequal associations that were suited to the condition of utilization prior to the change. As a result, it is highly likely that bias in output physical port selection will increase. In Embodiment 1, such bias increasing in output physical port selection in the event of a change in the condition of utilization of the network system 900 can be suppressed by modifying the computational expression, without modifying associations between computation results and output physical ports.

In the embodiment shown in FIG. 12, the computational expression (second setting value set SS2) used by the third switch device SW30 differs from the computational expression (first setting value set SS1) used by the switch devices SW20, SW60 of the preceding stage. Consequently, the trend of bias in output physical port selection in the third switch device SW30 of the subsequent stage differs from the trend of bias in output physical port selection in the switch devices SW20, SW60 of the preceding stage. As a result, it is possible to avoid excessive increase in bias due to bias in the switch devices SW20, SW60 of the preceding stage becoming compounded with bias in the third switch device SW30 of the subsequent stage.

Here, in preferred practice, establishment of the hash setting value set, i.e. selection (modification) of the computational expression, will be carried out prior to initiating operation of the network system 900. Where prior to initiating operation, the third switch device SW30 of the subsequent stage is given a computational expression different from the computational expression of the switch devices SW20, SW60 of the preceding stage, it is possible to prevent communication load bias from occurring. For example, prior to initiating operation the user could input an instruction to modify the computational expression, to one of the subsequent stage switch device and the preceding stage switch device.

In Embodiment 1, the hash value generator 220 (FIG. 2) corresponds to the "computing module" in the claims. The setting value controller 230 corresponds to the "modifying module" in the claims. The data cited in Step S200 of FIG. 9 corresponds to the "seed information." In Embodiment 1, it is possible to use computational expressions equal in number to the number of different setting value sets.

Embodiment 2

Figure 13:
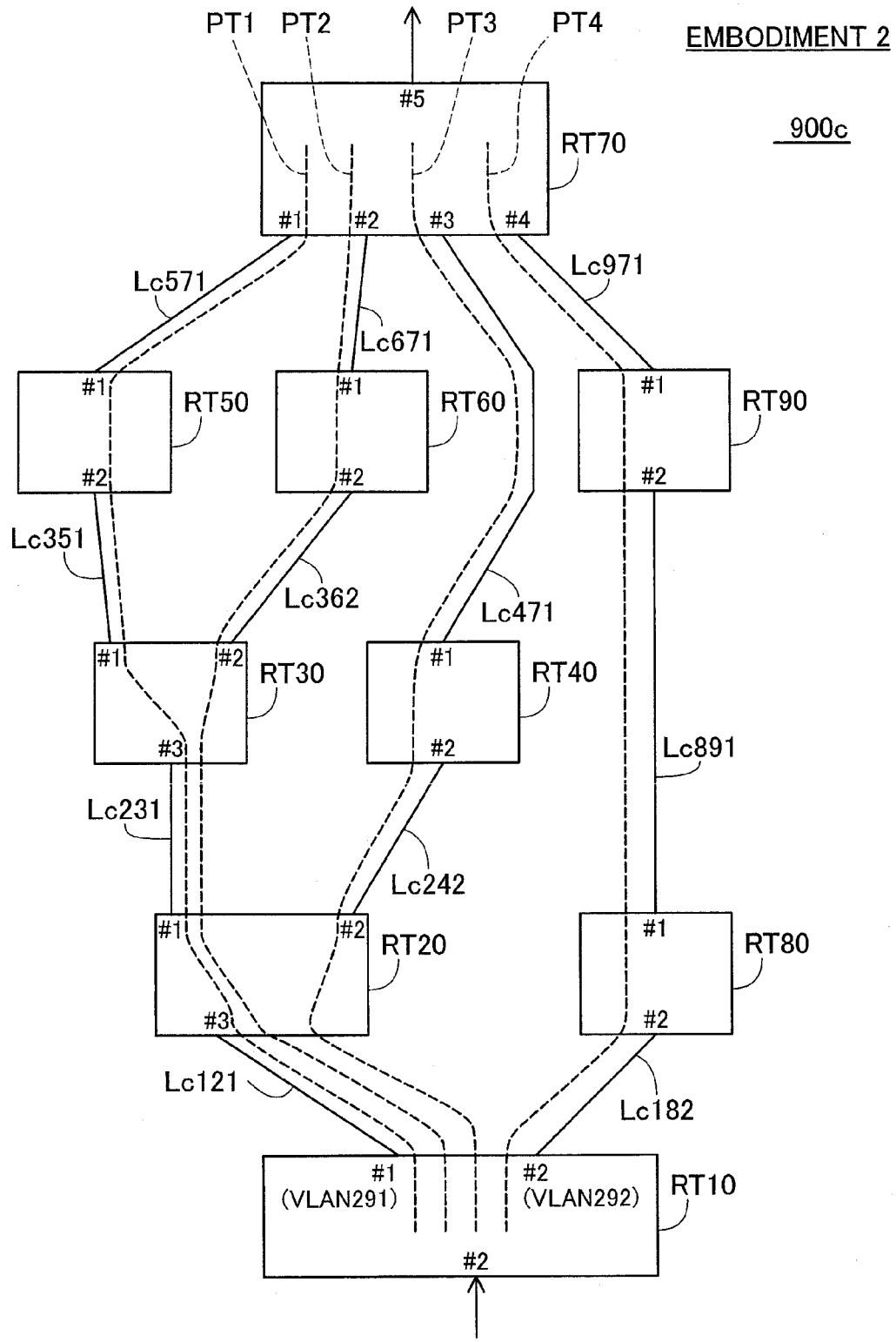
FIG. 13 is an illustration depicting a network system 900c in Embodiment 2.

FIG. 13 is an illustration depicting a network system 900c in Embodiment 2. This network system 900c has nine switch devices RT10 to RT90. In Embodiment 2, the switch devices RT10 to RT90 all function as "Layer 3 switches (also called routers)."

In this network system 900c, the first switch device RT10 and the seventh switch device RT70 are connected by four pathways PT1 to PT4. The first pathway PT1 is a pathway that leads from the first switch device RT10 through the three switch devices RT20, RT30, RT50 in that order, to arrive at the seventh switch device RT70. The second pathway PT2 is a pathway that leads from the first switch device RT10 through the three switch devices RT20, RT30, RT60 in that order, to arrive at the seventh switch device RT70. The third pathway PT3 is a pathway that leads from the first switch device RT10 through the two switch devices RT20, RT40 in that order, to arrive at the seventh switch device RT70. The fourth pathway PT4 is a pathway that leads from the first switch device RT10 through the two switch devices RT80, RT90 in that order, to arrive at the seventh switch device RT70. In the example of FIG. 13, the switch devices are connected by only a single physical line.

In the switch devices RT10 to RT90 shown in the drawing, the physical ports are denoted by a combination of the symbol "#" with a number. Symbols composed of the sign "Lc" and a 3-digit number are appended to the lines connected to each of the switch devices RT10 to RT90 shown in the drawing. Here, the hundreds position indicates the number of the switch device lying towards the first switch device RT10. The tens position indicates the number of the switch device lying towards the seventh switch device RT70. The ones position indicates the number of the physical port lying towards the first switch device RT10. For example, the line Lc471 is a line that connects the fourth switch device RT40 with the seventh switch device RT70, and that connects to the first physical port #1 of the fourth switch device RT40. This convention is employed for the other lines as well.

The hardware configuration of the switch devices RT10 to RT90 is the same as for the switch devices SW shown in FIG. 2. Furthermore, a routing table and an ARP table are stored in the memory 300 as well as the link aggregation table 400 (FIG. 3) and the filter table 410. FIG. 14 is an illustration depicting an exemplary routing table, ARP table, and filter table. Tables used by the first switch device RT10 are illustrated by way of example in FIG. 14.

The routing table 430 shown in FIG. 14(A) stores associations among a destination IP address, a logical interface, a next hop IP address, and a metric. The destination IP address represents the IP address of the ultimate destination of a packet. This destination IP address is not limited to a single IP address; it is possible to set a range that includes two or more IP addresses. The IP address range is typically represented by a combination of a so-called network address and a subnet mask.

The logical interface represents the logical interface at which the destination IP address is accessible. In Embodiment 2, narrowing down the multiple physical ports to the particular physical port by which the packet should be sent is initially carried out in units of groups composed of one or more physical ports. Such a group constitutes a logical interface. In Embodiment 2, the VLANs mentioned earlier are utilized as such groups (logical interfaces). That is, initially, the VLAN (network segment) utilized to relay the packet will be selected.

Multiple logical interfaces may be associated with the same destination IP address. In the example of FIG. 14(A), two logical interfaces ("first VLAN 291" and "second VLAN 292") are associated with the same first IP address range IPrange1 (see the first and second entries RE1, RE2). This means that regardless of which of the two logical interfaces a packet is transmitted from, the packet will be able to reach the same destination IP address. For example, in the example of FIG. 13, in the first switch device RT10 the first physical port #1 belongs to the first VLAN 291 and the second physical port #2 belongs to the second VLAN 292. Consider a case where a packet destined for a destination within the first IP address range IPrange1 is to be relayed from the first switch device RT10 to the seventh switch device RT70. In this case, the packet could be transmitted from either the first VLAN 291 or the second VLAN 292 (i.e. from either the first physical port #1 or the second physical port #2). Furthermore, when transmitting the packet, a single logical interface is selected first. A single line port is then selected from among the multiple line ports included in the selected logical interface. The specifics of this process will be discussed later.

Next hop refers to the next switch device. Specifically, when a packet is transmitted to the next hop, the packet can reach the final destination IP address. Each logical interface of the routing table 430 has associated with it a single next hop IP address accessible from that logical interface. For example, in the example of FIG. 14(A), the IP address IPaRT20 of the second switch device RT20 is associated with the first VLAN 291 (first entry RE1). The IP address IPaRT80 of the eighth switch device RT80 is associated with second VLAN 292 (second entry RE2).

The metric represents an order of precedence for selection of the logical interface. A smaller metric indicates higher order of precedence. As such a metric it would be possible to employ, for example, the number of hops (total number of routers through which the packet passes) or OSPF cost.

The destination search module 210 sets up the routing table 430 in accordance with user instructions. Such instructions may be input, for example, via a control panel (not shown) provided to the switch device, or an administration terminal (not shown) connected to the switch device. Alternatively, the destination search module 210 may construct (or modify) the routing table 430 automatically. In this process the destination search module 210 may construct (or modify) the routing table 430 on the basis of information transmitted by a routing protocol such as RIP (Routing Information Protocol) or OSPF (Open Shortest Path First).

FIG. 14(B) depicts an exemplary ARP table 440. This ARP table 440 stores associations between IP addresses and MAC addresses. In the example of FIG. 14(B), associations relating to the second switch device RT20 and the eighth switch device RT80 are stored. The destination search module 210 constructs the ARP table 440 automatically. Specifically, the destination search module 210 acquires the source IP address and the source MAC address by referring to the header information of the packets received by the switch device SW. The destination search module 210 then stores these address associations in the ARP table 440. The destination search module 210 could also construct the ARP table 440 on the basis of information transmitted by ARP (Address Resolution Protocol).

FIG. 14(C) depicts an exemplary filter table. In this example, associations relating to the MAC address MAC-aRT20 of the second switch device RT20 and the MAC address MACaRT80 of the eighth switch device RT80 are shown. The second switch device RT20 is connected to the first physical port #1 included in the first VLAN 291. The switch device RT80 is connected to the second physical port #2 included in the second VLAN 292.

Figure 15:
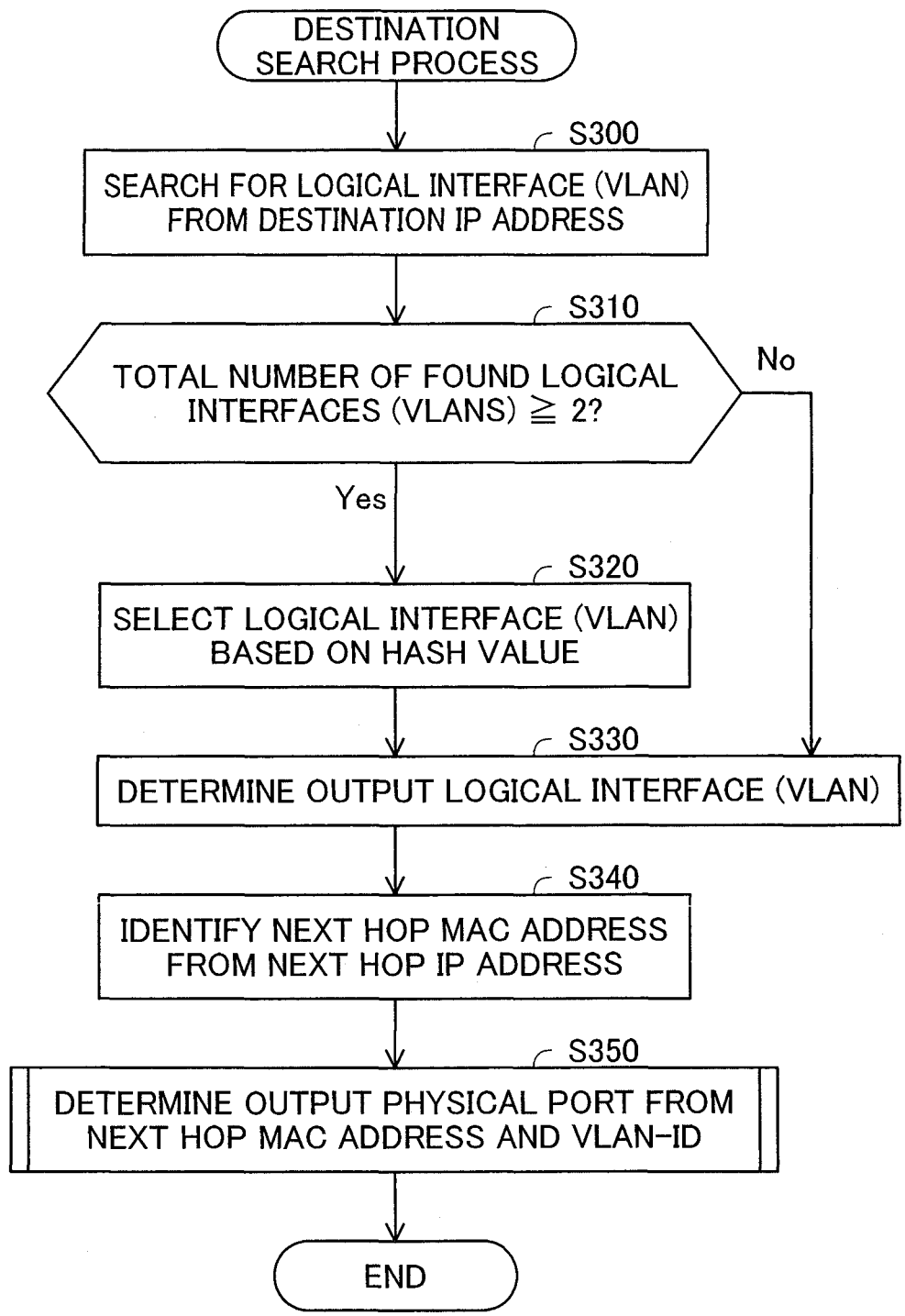
FIG. 15 is a flowchart depicting the procedure of the destination search process in Embodiment 2.

FIG. 15 is a flowchart depicting the procedure of the destination search process in Embodiment 2. In the initial Step S300, the destination search module 210 (FIG. 2) looks up in the routing table 430 (FIG. 14(A)) in order to search for the logical interface (VLAN) associated with the destination IP address of the received packet. In some instances, multiple logical interfaces associated with the same destination IP address will be searched. In this case, the destination search module 210 selects the logical interface with the highest order of precedence (smallest metric).

In the next Step S310, the destination search module 210 decides whether the total number of logical interfaces selected is 2 or more. In the event that the total number of logical interfaces selected in Step S300 is "1," The destination search module 210 will use that logical interface as the logical interface for output (Step S330). For example, in the example of FIG. 14(A), in the event that the destination IP address is included in the second IP address range IPrange2, the third VLAN 300 will be used.

In some instances, multiple logical interfaces having the same order of precedence (metric) may be selected in Step S300. For example, in the example of FIG. 14(A), in the event that the destination IP address is included in the first IP address range IPrange1, the first VLAN 291 and the second VLAN 292 will be selected. In this case, in the next Step S320, the destination search module 210 will select a single logical interface on the basis of a hash value. This selection is carried out in the same manner as selection of a single physical port from among multiple physical ports included in a logical port, as described in Embodiment 1. Specifically, first, the hash value generator 220 (FIG. 2) generates a hash value using the control information and header information. The destination search module 210 then selects a single logical interface on the basis of the hash value. This selection is carried out in the same manner as the method employing the relational expression given in FIG. 10(A).

The single logical interface (VLAN) selected in the above manner is adopted as the logical interface to be used for transmitting the received packets (Step S330). Here, the use of a certain logical interface for transmitting the received packets means that the packets will be transmitted from a physical port included in the logical interface. In the present embodiment, the logical interface corresponds to the "port group" in the claims.

In the next Step S340, the destination search module 210, referring to the routing table 430 (FIG. 13(A)), acquires the IP address of the next hop associated with the output logical interface. The destination search module 210 then refers to the ARP table 440 (FIG. 14(B)) in order to acquire the MAC address of the next hop from the IP address of the next hop.

In the next Step S350, the destination search module 210 determines a physical port for transmitting the packets to the next hop. This determination is made in the same manner as in Embodiment 1 illustrated in FIG. 4. In this process, the line port to which the MAC address of the next hop belongs is selected from the VLAN (logical interface) that was determined in Step S330. The final output physical port is then selected from the selected line port. Next, the packet is transmitted from the selected output physical port to the next hop.

Next, consider a case in which, in the example of FIG. 13, a packet is relayed from the first switch device RT10 to the seventh switch device RT70. Here, in order to simplify the discussion let it be assumed that the link aggregation function (logical port) is not used. The first IP address range IPrange1 of FIG. 14(A) is assumed to include the destination IP address of the received packet.

In this case, in the first switch device RT10, the destination search module 210 will initially select a single logical interface from among the two logical interfaces VLAN 291, 292, on the basis of the hash value. Next, the destination search module 210 will select a single physical port for transmitting the packet to the next hop corresponding to the single selected logical interface. For example, where the first VLAN 291 has been selected, the first physical port #1 connected to the next hop RT20 will be selected (FIG. 14(C)). The packet will then be transmitted from the first physical port #1 to the second switch device RT20. On the other hand, where the second VLAN 292 has been selected, the second physical port #2 connected to the eighth switch device RT80 will be selected. The packet will then be transmitted from the second physical port #2 to the eighth switch device RT80. In the event that in the filter table 410 (FIG. 14(C)) the line port associated with the next hop MAC address is a logical port, the destination search module 210 will select one physical port from among the multiple physical ports included in the logical port. This selection is carried out in the same manner as in Embodiment 1.

Either of two physical ports #1, #2 may be selected in the second switch device RT20 and the third switch device RT30 as well. In Embodiment 2, let it be assumed that in the switch devices RT20, RT30, the physical port #1, #2 are included in different logical interfaces (VLANs) respectively, and the order of precedence (metric) of these two logical interfaces is the same. As a result, in each of the switch devices RT20, RT30, physical port selection is carried out in the same manner as in the first switch device RT10.

Consider a case where various packets are being relayed from the first switch device RT10 to the seventh switch device RT70. Let it be assumed that identical computational expressions (hash setting values) are used in all three switch devices RT10, RT20, RT30. In this case, as with the comparative example illustrated in FIG. 11, there is a high probability that the pathway for packet transfer will become biased towards a specific pathway. For example, let it be assumed that in the first switch device RT10, the first physical port #1 is selected with proportionally high frequency. Thus, in the second switch device RT20, which utilizes the same computational expression, there will be a similar high probability that physical port selection will become biased towards a particular physical port. Here, let it be assumed that the first physical port #1 is selected with proportionally high frequency. Similarly, in the third switch device RT30, which also utilizes the same computational expression, there will also exist a high probability that physical port selection will become biased towards a particular physical port. Here, let it be assumed that the first physical port #1 is selected with proportionally high frequency. In this case, the packet transmission pathway will become biased towards the first pathway PT1.

Now consider the case where different computational expressions (hash setting values) are used in each of the three switch devices RT10, RT20, RT30. In this case, the trend of bias in output physical port selection will differ among the switch devices RT10, RT20, RT30. Consequently, as in Embodiment 1 illustrated in FIG. 12, it will be possible to ameliorate bias in output physical port selection, i.e. bias of the packet transmission pathway.

In this way, in the switch devices RT10 to RT90 of Embodiment 2, the computational expressions for hash values (hash setting values) are variable. As a result, it is possible to alter the trend of bias towards a specific logical interface (VLAN) for packet transmission. As a result, it is possible to alter the trend of bias towards a specific network segment utilized in packet relay, thus ameliorating bias in the communication load.

In some instances like that depicted in FIG. 13, redundant communication pathways are built by series-connection of multiple switch devices. According the present embodiment, the computational expression (hash setting value) in preceding stage switch devices can be made to differ from the computational expression (hash setting value) in subsequent stage switch devices in such instances as well. It will be possible thereby to suppress bias increasing in communication load caused by compounding bias in preceding stage switch devices and bias in subsequent stage switch devices.

In Embodiment 2 illustrated in FIG. 13, the switch devices are connected by only a single physical line; however, the switch devices could be connected using logical ports instead. Where a single logical interface includes multiple physical ports, it would be conceivable to establish the same order of precedence (metric) for each of the multiple physical ports.

In the present embodiment, both the LA hash values and multi-path hash values are generated by the same hash value generator 220 (FIG. 2). However, it would be possible to instead independently provide a first hash value generator for generating LA hash values, and a second hash value generator for generating multi-path hash values. Here, LA hash values refer to hash values for the purpose of selecting an output physical port from a single logical port. Multi-path hash values refer to hash values for the purpose of selecting an output logical interface from among multiple logical interfaces having the same order of precedence. In preferred practice the first and second hash value generators will employ mutually different computational expressions. It is possible thereby to prevent the output logical interface and the physical port selected from the logical port from becoming biased in the same manner.

Here, it would be acceptable to provide a single computational expression utilizable for the purpose of LA hash values. However, for the purpose of ameliorating biased communication load, it would be preferable for computational expressions utilizable for the purpose of LA hash values to number two or more.

In the present embodiment, any of various methods may be employed as the method for selecting the output physical port from among multiple physical ports included in a single logical port, where the logical port has been selected based on a hash value. For example, a prescribed physical port designated by the user may be selected. In either case, since selection of the logical interface which includes the output physical port is made on the basis of a hash value, it can be said that the physical port which is ultimately selected is selected on the basis of a hash value as well. "Selecting a physical port for transfer of a received packet from among a plurality of candidate ports on the basis of computation results" refers in the broad sense to instances in which the output physical port is designated from the computation results alone, and to instances in which the output physical port is designated using the computation results plus other additional information. In the latter instance, it is preferable to designate (select) a smaller number of candidate ports from among the multiple candidate ports, on the basis of the computation results.

C. Embodiment 3

Figure 16:
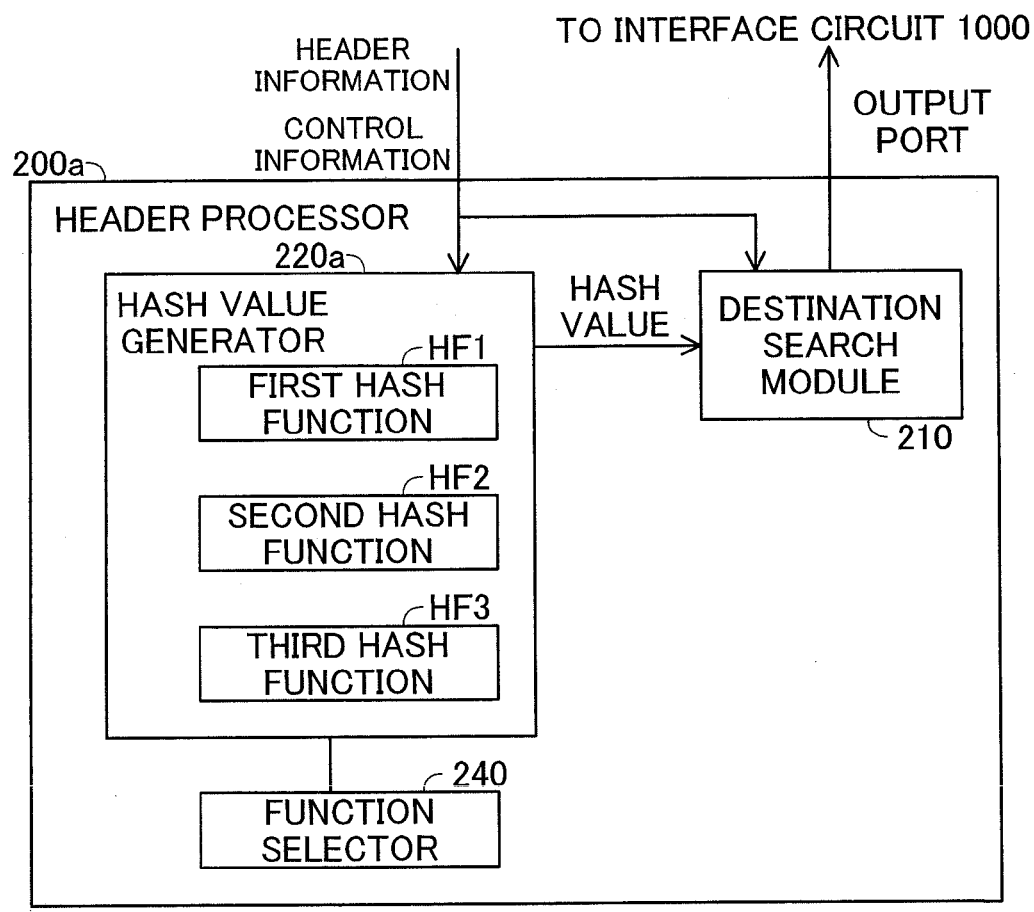
FIG. 16 is an illustration depicting the configuration of a header processor 200a in Embodiment 3.

FIG. 16 is an illustration depicting the configuration of a header processor 200a in Embodiment 3. There are two points of difference from the header processor 200 of Embodiment 1 illustrated in FIG. 2. The first difference is that a function selector 240 is provided in place of the setting value controller 230. The second difference is that the hash value generator 220a is capable of utilizing three mutually different hash functions HF1 to HF3. The other configuration of the switch devices is the same as that of the switch devices SW of Embodiment 1 illustrated in FIG. 2. In FIG. 16, only the header processor 200a is shown by way of the constituent elements of the switch device; the other elements are omitted from the drawing.

The function selector 240 selects one hash function from among the three hash functions HF1 to HF3. The hash value generator 220a then computes hash values on the basis of the hash function selected by the function selector 240. Various mutually different hash functions may be employed as the hash functions HF1 to HF3. The function selector 240 selects one of the hash functions in accordance with user instruction. Alternatively, the function selector 240 could select one hash function automatically. For example, the hash function could be selected at random.

In Embodiment 3, the hash value generator 220a corresponds to the "computing module" in the claims. The function selector 240 corresponds to the "modifying module" in the claims. The total number of utilizable computational expressions is not limited to 3, and it would be possible to employ any number of 2 or greater.

Embodiment 4

Figure 17:
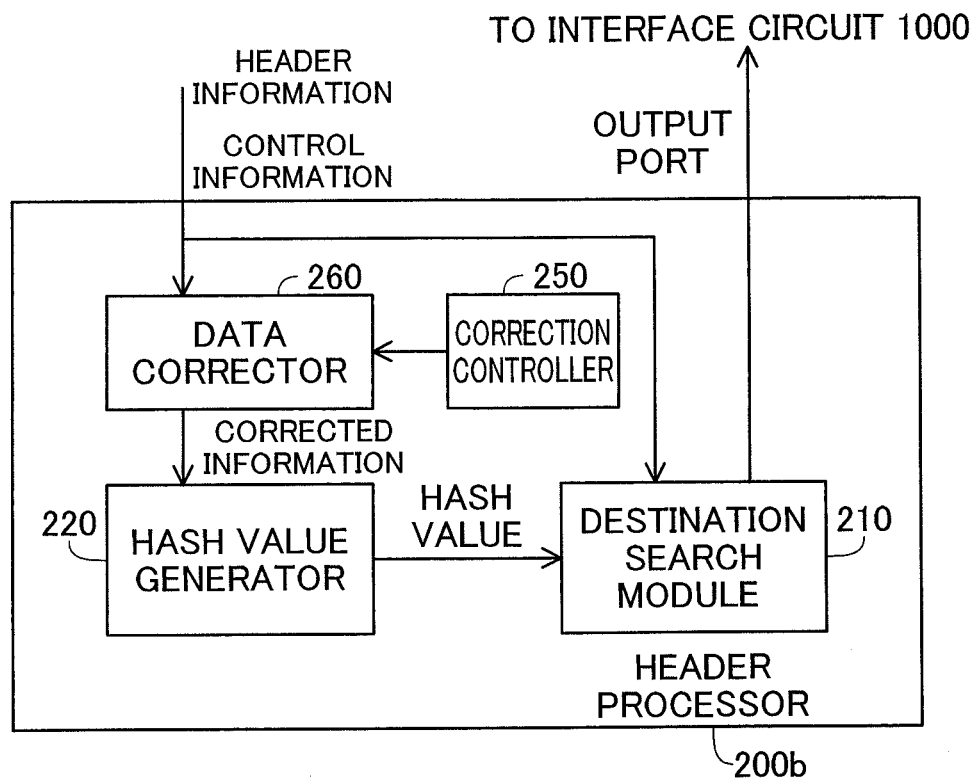
FIG. 17 is an illustration depicting the configuration of a header processor 200b in Embodiment 4.

FIG. 17 is an illustration depicting the configuration of a header processor 200b in Embodiment 4. The only difference from the header processor 200 of Embodiment 1 illustrated in FIG. 2 is that a correction controller 250 and a data corrector 260 are provided in place of the setting value controller 230. The hash value generator 220 generates hash values according to a prescribed hash function.

The data corrector 260 performs correction of at least a portion of the seed information (in the present embodiment, header information and control information) used in computing the hash values. For example, it may invert bit data at prescribed bit locations in the source MAC address and destination MAC address respectively. Furthermore, an predetermined additional value may be added to the receiving VLAN (this operation may be performed without carry). As a result, even where hash values are generated for the same packet, the hash value that will be generated can be varied by correcting the data supplied to the hash value generator 220. That is, in Embodiment 4, the computational expression is determined overall by data correction performed by the data corrector 260, and by the hash function used by the hash value generator 220.

Correction by the data corrector 260 is controlled by the correction controller 250. For example, the bit locations for inverting bit data and the additional values mentioned above may be established by the correction controller 250. The computational expression is modified by changing these parameters. The correction controller 250 makes these settings (modifications) according to user instructions. Alternatively, the correction controller 250 could make these settings automatically. For example, the correction controller 250 could determine the bit locations and additional values at random.

In Embodiment 4, the entirety of the hash value generator 220 and the data corrector 260 correspond to the "computing module" in the claims. The correction controller 250 corresponds to the "modifying module" in the claims. The method of correcting the seed information in this way is not limited to methods involving inversion of bit data at prescribed bit locations, or methods involving addition of an additional value, and various other methods may be used. For example, data may be corrected by a division operation.

E: Variants

The constituent elements of the preceding embodiments, apart from element claimed in the independent claims, are additional elements and can be dispensed with where appropriate. The invention is in no wise limited to the embodiments described hereinabove and can be reduced to practice in various other ways without departing from the scope and spirit thereof, as in the following variants.

Variant 1

In the preceding embodiments, the computational expression used to select a physical port for output (transmission) purposes from among multiple physical ports included in a logical port is not limited to the computational expression shown in FIGS. 8 and 9, it being possible to employ various computational expressions for the purpose of computing representative values from the seed information. In preferred practice, a hash function will be employed as the computational expression. A hash function is a function for generating pseudo-random numbers (hash values) of fixed length from the seed information. The hash function is not limited to the function (computational expression) shown in FIGS. 8 and 9, it being possible to employ various other functions such as MD5 (Message Digest 5), SHA-1 (Secure Hash Algorithm 1), SHA-2, or the like. Where a hash function is employed, value range bias in the computation results (hash values) is small. Furthermore, similar computation results (hash values) are not readily generated from the similar seed information. Accordingly, where a hash function is employed as the computational expression, it is a simple matter to avoid bias towards a specific physical port in the selection of the physical port. The above is applicable analogously to computational expressions used for selecting an output (transmission) logical interface from among multiple logical interfaces.

Variant 2

In the preceding embodiments, the seed information for the computation used to select an output physical port from among multiple physical ports included in a logical port is not limited to the information shown in Step S200 of FIG. 9; it is possible to employ various types of information that includes at least one of the destination information and source information associated with the packets. For example, the computation may be performed using source information only, without using destination information. By so doing, multiple physical ports can be assigned for use according to the source. Conversely, the computation may be performed using destination information only, without using source information. By so doing, multiple physical ports can be assigned for use according to the destination. It is also possible to perform computations using header information only, without using control information.

The reason for using information that includes at lease one of destination information and source information as the seed information is as follows. The purpose is to prevent rearrangement of the transfer sequence of multiple packets transferred between two network devices, due to relaying of the packets by network relay devices.

The packet communication method herein is not limited to methods employing Ethernet™ or methods using Internet Protocol, it being possible to employ any communication method. In any case, various types of information relating to destination (e.g. any information from among the destination MAC address, destination IP address, or destination port (L4 port)) can be used as destination information. Likewise, various types of information relating to source (e.g. any information from among the source MAC address, source IP address, or source port (L4 port)) can be used as source information.

The above discussion is applicable analogously to the seed information in computations used for selecting an output logical interface from among multiple logical interfaces.

Variant 3

In the preceding embodiments, the method for selecting a physical port on the basis of computation results is not limited to the method illustrated in FIG. 10, and various other methods may be employed. For example, where the total number of candidate ports is denoted by "n" (n is an integer equal to 2 or greater), the remainder obtained by division of the computation result by "n" could be employed as the selection number. In general, associations between computation results and physical ports can be determined by any method. However, in order to avoid bias of selected ports towards specific ports under various conditions of utilization of a network system, it is preferable for ranges of computation result associated with the physical ports to be equal in size. This applies to methods for selecting logical interfaces based on computation results as well.

Variant 4

In the preceding embodiments, the computing module may utilize at least two mutually different computational expressions. However, in order to avoid bias in output physical port selection under various conditions of utilization of a network system, it is preferable that the computing module be capable of using three or more mutually different computational expressions. This applies to methods for selecting logical interfaces based on computation results as well.

Variant 5

In the preceding embodiments, any computational expressions selected from among a number of serviceable computational expressions may be employed as the computational expressions used by the computing module. However, in preferred practice selection of computational expressions will be done in such a way as to minimize bias in output physical port selection. For example, the destination search module 210 may record the level of traffic in each physical port (e.g. the number of transmitted packets) in memory, for presentation to the user. In the event of appreciable imbalance in the presented traffic levels, the user may input to the modifying module an instruction to modify the computational expression. Presentation of traffic levels and input of computational expression modification commands may be accomplished through a control panel (not shown) provided to the switch device, or an administration terminal (not shown) connected to the switch device.

Alternatively, the modifying module could modify the computational expression automatically. For example, in the event that imbalance of traffic levels exceeds a prescribed imbalance level, the modifying module may modify the computational expression automatically. Specifically, at prescribed intervals (e.g. one day), the modifying module may modify the computational expression automatically in the event that the differential between the maximum value and minimum value of cumulative traffic on physical ports exceeds a prescribed threshold value.

The above discussion applies to methods for selecting logical interfaces based on computation results as well.

Variant 6

In certain instances, as in the preceding embodiments, multiple switch devices (network relay devices) may be connected directly. In such instances, it is preferable for two switch devices connected to one another to use different computational expressions. By so doing, it will possible to suppress bias increasing caused by compounding bias in output physical port selection by preceding stage switch devices and bias in output physical port selection by subsequent stage switch devices.

Where two switch devices are connected to one another, the user may set the computational expressions of the two switch devices so that the computational expressions differ from each other. Specifically, the user may input a computational expression modification command to at least one of the two switch devices. In preferred practice this setting (modification) of computational expressions will be carried out prior to initiating operation of the network system.

Alternatively, the computational expressions of the two switch devices may be made to differ from each other by automatically modifying the computational expression of at least one of the two switch devices. For example, the modifying modules of the switch devices may exchange information relating to the computational expressions used by the switch devices to which they respectively belong. Such exchange may take place through the lines connecting the switch devices. Then, one of the modifying modules may identify the computational expression used by the other switch device, and automatically modify the computational expression used by its own switch device to a computational expression that differs from the identified computational expression. Any method can be employed as the method for selecting, from among the two modifying modules, the modifying module that will modify the computational expression in this process. For example, the modifying module belonging to the switch device having the smaller unique identifying number may be selected.

In preferred practice, this process of modifying the computational expressions executed by the two switch devices (modifying modules) will be carried out automatically prior to initiating operation of the network system. For example, the modification process may be initiated in response to connection of the two switch devices by a line. However, the modification process could also be initiated in response to a user instruction. It is possible to use any process capable of causing the switch devices to utilize mutually different computational expressions, as the modification process for this purpose. Also, any method could be used as the communication method for the purpose of the modification process. For example, information could be exchanged using the HTTP protocol.

Increased bias due to compounding of bias becomes increasing prominent with greater numbers of series-connected switch devices. Consequently, where the number of series-connected switch devices is three or more, it will be preferable for two switch devices connected to one another to use different computational expressions. In especially preferred practice, any combination of two switch devices among all of the series-connected switch devices will use different computational expressions.

Variant 7

In Embodiment 2 illustrated in FIGS. 13 to 15, the logical interfaces (port groups) are not limited to VLANs, and it would be possible to employ any arbitrarily established groups of physical ports. For example, the logical ports discussed previously could be employed as port groups. In this case, the logical port for use in transmitting a received packet may be selected on the basis of the computation results, from among multiple logical ports that include physical ports (candidate ports) able to access the destination of the received packet. However, where switch devices that divide a network by VLANs are employed, in many instances the packet communication pathway will differ appreciably depending on the VLAN used for packet transmission. Consequently, where VLANs are employed as logical interfaces, it is a simple matter to alleviate communication pathway bias, since VLANs are selected on the basis of computation results.

Moreover, it is acceptable for a single physical port to belong to multiple output port groups. For example, where so-called "Tag-VLAN" is employed, a single physical port may belong to multiple VLANs (logical interfaces).

Variant 8

Network system configurations are not limited to the network system 900 shown in FIG. 1 or the network system 900c shown in FIG. 13, and various other configurations may be employed. The number of switch devices (network relay devices) and the number of lines may also be selected arbitrarily. Pathways may be constructed arbitrarily as well. For example, in Embodiment 2 of FIG. 13, the pathway leading to the same destination IP address through a single switch device could be branched through three or more mutually different physical ports belonging to that switch device. These multiple physical ports could be included in mutually different logical interfaces (e.g. VLANs). Likewise, switch device configuration is not limited to the configurations shown in FIG. 2, 16, or 17, and various other configurations may be employed. For example, various configurations that modify computational expressions manually or automatically could be employed as the configuration for the modifying module.

In the preceding embodiments, switch devices (network relay devices) may execute both processes in a Layer 2 switch capacity, and processes in a Layer 3 switch capacity. In this case, there could be independently provided a first header processor for executing processes in a Layer 2 switch capacity, and a second header processor for executing processes in a Layer 3 switch capacity.

Variant 9

In the preceding embodiments, some of the arrangements realized through hardware could be replaced by software, and conversely some of the arrangements realized through software could be replaced by hardware. For example, the header processor 200 of FIG. 2 could be replaced by a computer having a CPU and memory. In this case, the various functions of the header processor 200 would be achieved through execution of a program by the CPU.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system having a plurality of network devices, each of the plurality of network devices comprising:
    an interface module including a plurality of physical ports to transmit and receive packets;
    a computing module configured to execute a computing process with a computational expression using seed information, the seed information including at least one of destination information and source information associated with a received packet;
    a destination search module configured to, based on the result of the computation, select a physical port for transmission of the received packet from a plurality of candidate ports among the plurality of physical ports; and
    a modifying module configured to modify the computational expression,
    wherein the plurality of network devices include a preceding-stage network device and a subsequent-stage network device, the subsequent-stage network device being directly coupled to the preceding-stage network device with physical wiring, and wherein the subsequent-stage network device and the preceding-stage network device are configured to use different expressions in the computing process.

2. The system according to claim 1, wherein some of the plurality of physical ports are aggregated to make a logical port such that a plurality of logical ports are formed from the plurality of physical ports;

the computational expression includes a first computational expression selecting one logical port from among the plurality of logical ports and a second computational expression selecting one physical port from among the plurality of physical ports.

3. The system according to claim 2, wherein the destination search module selects the one logical port among the plurality of logical ports according to the first computational expression, and selects the one physical port among the plurality of physical ports according to the second computational expression as destination.

4. The system according to claim 2, wherein the first computational expression and the second computational expression are different from each other.

5. The system according to claim 2, wherein the first computational expression and the second computational expression are formulated to use different pieces of seed information.

6. A method effected in a system having a plurality of network devices, each of the plurality of network devices including an interface module including a plurality of physical ports to transmit and receive packets, each network device effecting the method comprising:

executing a computing process with a computational expression using seed information to effect a computation, the seed information including at least one of destination information and source information associated with a received packet;

selecting, based on the result of the computation, a physical port for transmission of the received packet from a plurality of candidate ports among the plurality of physical ports; and modifying the computational expression, wherein the plurality of network devices include a preceding-stage network device and a subsequent-stage network device, the subsequent-stage network device being directly coupled to the preceding-stage network device with physical wiring, and wherein the subsequent-stage network device and the preceding-stage network device are configured to use different expressions in the computing process.

7. The method according to claim 6, wherein some of the plurality of physical ports are aggregated to make a logical port such that a plurality of logical ports are formed from the plurality of physical ports;

the computational expression includes a first computational expression selecting one logical port from among the plurality of logical ports and a second computational expression selecting one physical port from among the plurality of physical ports.

8. The method according to claim 7, wherein the selecting operation selects the one logical port among the plurality of logical ports according to the first computational expression, and selects the one physical port among the plurality of physical ports according to the second computational expression as a destination.

9. The method according to claim 7, wherein the first computational expression and the second computational expression are different from each other.

10. The method according to claim 7, wherein the first computational expression and the second computational expression are formulated to use different pieces of seed information.

\* \* \* \* \*